(12) United States Patent
Hosokawa et al.

(10) Patent No.: US 9,796,812 B2
(45) Date of Patent: Oct. 24, 2017

(54) POLYMERS AND PROCESSES FOR PREPARING THE POLYMERS

(71) Applicants: THE UNIVERSITY OF TOKYO, Tokyo (JP); FUJIFILM Corporation, Tokyo (JP)

(72) Inventors: Takafumi Hosokawa, Kanagawa (JP); Toshihide Yoshitani, Kanagawa (JP); Shingo Ito, Tokyo (JP); Kyoko Nozaki, Tokyo (JP); Ryo Nakano, Tokyo (JP)

(73) Assignees: THE UNIVERSITY OF TOKYO, Tokyo (JP); FUJIFILM Corporation, Tokyo (JP)

( * ) Notice: Subject to any disclaimer, the term of this patent is extended or adjusted under 35 U.S.C. 154(b) by 46 days.

(21) Appl. No.: 14/939,160

(22) Filed: Nov. 12, 2015

(65) Prior Publication Data

US 2016/0090442 A1 Mar. 31, 2016

Related U.S. Application Data

(63) Continuation of application No. PCT/JP2014/062479, filed on May 9, 2014.

(30) Foreign Application Priority Data

May 13, 2013 (JP) ................ 2013-101306
Dec. 19, 2013 (JP) ................ 2013-262358

(51) Int. Cl.
C08G 63/08 (2006.01)
C08F 24/00 (2006.01)
C09D 133/06 (2006.01)
C09D 167/04 (2006.01)

(52) U.S. Cl.
CPC .......... *C08G 63/08* (2013.01); *C08F 24/00* (2013.01); *C09D 133/06* (2013.01); *C09D 167/04* (2013.01)

(58) Field of Classification Search
USPC ................................. 528/354, 355
See application file for complete search history.

(56) References Cited

U.S. PATENT DOCUMENTS

| 4,071,667 A | 1/1978 | Ikeda et al. |
| 4,393,224 A * | 7/1983 | Daniels ............ C07C 2/406 549/273 |
| 5,880,235 A | 3/1999 | Schwind et al. |

FOREIGN PATENT DOCUMENTS

| CN | 102159560 A | 8/2011 |
| EP | 0 960 897 A1 | 12/1999 |
| JP | 2003-195504 A | 7/2003 |

OTHER PUBLICATIONS

Extended European Search Report dated Feb. 23, 2016 issued from the European Patent Office in corresponding European Application No. 14797767.2.
Office Action dated Aug. 1, 2016 from the State Intellectual Property Office of the P.R.C. in counterpart Chinese Application No. 201480026811.7.
Communication dated Jun. 7, 2016 issued by the Japanese Patent Office in Japanese application No. 2013-262358.
Kazuo Soga, et al., "Copolymerization of Carbon Dioxide and Some Diene Compounds", Die Makromolekulare Chemie, 1975, pp. 1907-1911, vol. 176.
Kazuo Soga, et al., "Copolymerization of Carbon Dioxide and Ethyl Vinyl Ether", Polymer Letters Edition, 1975, pp. 265-268, vol. 13.
Kazuo Soga, et al, "Copolymerization of Methyl Vinyl Ether and Carbon Dioxide", Polymer Letters Edition, 1975, pp. 543-548, vol. 13.
Wen-Yen Chiang, "Copolymerization of Carbon Dioxide and Acrylonitrile", Proc. Natl. Sci. Council, R.O.C., 1978, pp. 170-176, vol. 2, No. 2.
Vera Haack, et al., "Synthesis of polymers with an intact lactone ring structure in the main chain", Die Angewandte Makromolekulare Chemie, 1998, pp. 19-22, vol. 257, Issue 1.
Hiroshi Sugimoto, et al., "Copolymerization of Carbon Dioxide and Epoxide", Journal of Polymer Science: Part A: Polymer Chemistry, 2004, pp. 5561-5573, vol. 42.
Ryo Nakano, et al., "Copolymerization of carbon dioxide and butadiene via a lactone intermediate", Nature Chemistry, Apr. 2014, pp. 325-331, vol. 6, Issue 4.
International Search Report for PCT/JP2014/062479 dated Aug. 19, 2014 [PCT/ISA/210].
Written Opinion for PCT/JP2014/062479 dated Aug. 19, 2014 [PCT/ISA/237].
International Preliminary Report on Patentability issued from the International Bureau in counterpart International Application No. PCT/JP2014/062479, dated Nov. 26, 2015.
Office Action dated May 31, 2017 from the European Patent Office in counterpart European Application No. 14 797 767.2.

* cited by examiner

*Primary Examiner* — Tae H Yoon
(74) *Attorney, Agent, or Firm* — Sughrue Mion, PLLC

(57) ABSTRACT

Provided is a polymer obtained by homopolymerizing a lactone monomer. The polymer contains a structural unit having a lactone ring containing three or more carbon atoms, wherein at least one of the carbon atoms, except for C of —C(=O)O—, of the lactone ring forms a part of a main chain; and wherein at least one of the carbon atoms, except for C of —C(=O)O—, which forms the lactone ring and is other than the carbon atom(s) forming a part of the main chain is bridged with an atom of the main chain.

17 Claims, 19 Drawing Sheets

Fig. 11
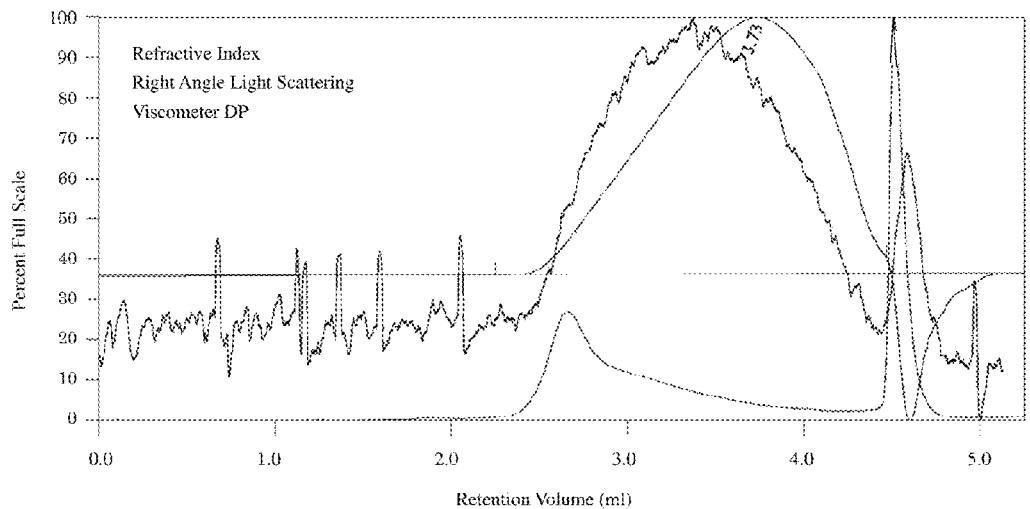
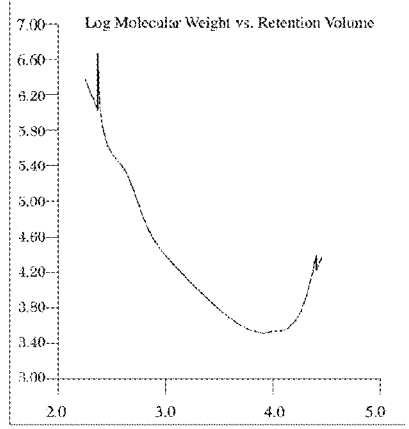
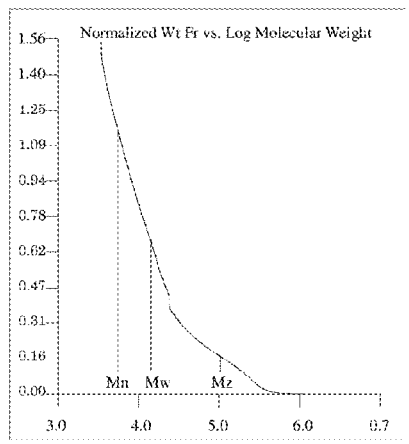

POLYMERS AND PROCESSES FOR PREPARING THE POLYMERS

CROSS-REFERENCE TO RELATED APPLICATIONS

This application is a Continuation of PCT International Application No. PCT/JP2014/062479 filed on May 9, 2014, which claims priority under 35 U.S.C §119(a) to Japanese Patent Application No. 2013-101306 filed on May 13, 2013 and Japanese Patent Application No. 2013-262358 filed on Dec. 19, 2013. Each of the above application(s) is hereby expressly incorporated by reference, in its entirety, into the present application.

TECHNICAL FIELD

The present invention relates to polymers and processes for preparing the polymers.

BACKGROUND ART

Carbon dioxide is an inexpensive and readily available carbon source that should be effectively utilized. However, current industrial applications of carbon dioxide are limited to the synthesis of urea, salicylic acid, carbonate esters and the like. Known applications of carbon dioxide as a material for polymers include the synthesis of polycarbonate esters by copolymerization with epoxides, but in a limited range of applications. The copolymerization of carbon dioxide with olefins among the more common monomers was reported in the 1970s, including the copolymerization of carbon dioxide with dienes, vinyl ethers, acrylonitrile and the like (e.g., see non-patent documents 1 to 4).

An example of the application of carbon dioxide as a material for polymers is disclosed in, for example, non-patent document 5 relating to polymers obtained by copolymerizing a lactone monomer consisting of carbon dioxide and a 1,3-diene structure. Further, non-patent document 6 discloses polymers consisting of carbon dioxide and an epoxy.

REFERENCES

Non-Patent Documents

Non-patent document 1: Soga, K.; Hosoda, S.; Ikeda, S. Die Macromol. Chem. 1975, 176, 1907-1911.
Non-patent document 2: Soga, K.; Hosoda, S.; Tasuka, Y.; Ikeda, S. J. Polym. Sci., Polym. Lett. 1975, 13, 265-268.
Non-patent document 3: Soga, K.; Sato, M.; Hosoda, S.; Ikeda, S. J. Polym. Sci., Polym. Lett. 1975, 13, 543-548.
Non-patent document 4: Chiang, W-Y. Proc. Natl. Sci. Council. R. O. C. 1978, 2, 170-176.
Non-patent document 5: Haack, V.; Dinjus, E.; Pitter, S. Die Angew. Makromol. Chem. 1998, 257, 19-22.
Non-patent document 6: Sugimoto, H.; Inoue, S. J. Polym. Sci., Part A: Polym. Chem. 2004, 42, 5561-5573.

SUMMARY OF THE INVENTION

Problems to be Solved by the Invention

Non-patent documents 1 to 4 disclose nothing about homopolymerization of a lactone monomer. Further, the polymers disclosed in non-patent documents 1 to 4 do not contain a lactone ring.

The technique disclosed in non-patent document 5 failed to homopolymerize a lactone monomer because the rates of other side reactions were higher than the rate of the homopolymerization reaction of the lactone monomer. Further, non-patent document 5 describes a trial to homopolymerize a lactone monomer, but does not report that it was successful.

Furthermore, the polymers disclosed in non-patent document 5 are those containing, for example, a structural unit shown below, wherein at least one of the carbon atoms forming the lactone ring excluding the carbon atom(s) forming a part of the main chain is not bridged with an atom of the main chain.

[Chemical formula 1]

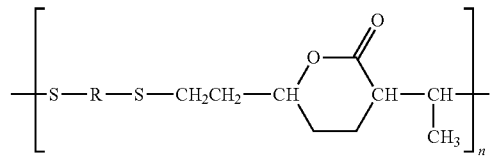

In addition, the polymers disclosed in non-patent document 5 are obtained by sequential polymerization and therefore they necessarily require sulfur-containing comonomers, which may produce toxic substances during disposal (incineration), resulting in a decrease in the carbon dioxide content in the polymers. These points are undesirable for environmental protection.

Non-patent document 6 discloses nothing about homopolymerization of a lactone monomer. Further, the polymers disclosed in non-patent document 6 do not contain a lactone ring.

The present invention aims to solve these problems, thereby providing polymers obtained by homopolymerizing lactone monomers.

Means to Solve the Problems

As a result of our careful studies under these circumstances, we succeeded in homopolymerizing lactone monomers by polymerizing the lactone monomers in such a manner that the rates of other reactions are lower than the rate of the homopolymerization reaction of the lactone monomers, and found that the problems described above can be solved.

Specifically, the above problems are solved by the following <1>, preferably <2> to <18>.
<1> A polymer comprising a structural unit having a lactone ring containing three or more carbon atoms, wherein at least one of the carbon atoms (except for C of —C(═O)O—) of the lactone ring forms a part of a main chain; and wherein at least one of the carbon atoms (except for C of —C(═O)O—) which forms the lactone ring and is other than the carbon atom(s) forming a part of the main chain is bridged with an atom of the main chain.
<2> The polymer according to <1>, comprising a structural unit represented by Formula (I-a):

[Chemical formula 2]

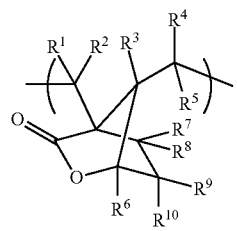

(I-a)

wherein $R^1$ to $R^{10}$ each independently represent a monovalent organic group, a halogen atom or a hydrogen atom.

<3> The polymer according to <1>, comprising a structural unit represented by Formula (I):

[Chemical formula 3]

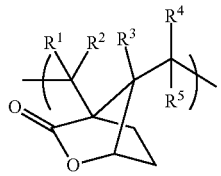
(I)

wherein $R^1$ to $R^5$ each independently represent a monovalent organic group, a halogen atom or a hydrogen atom.

<4> The polymer according to any one of <1> to <3>, further comprising a structural unit represented by Formula (II-a) and/or a structural unit represented by Formula (III-a):

[Chemical formula 4]

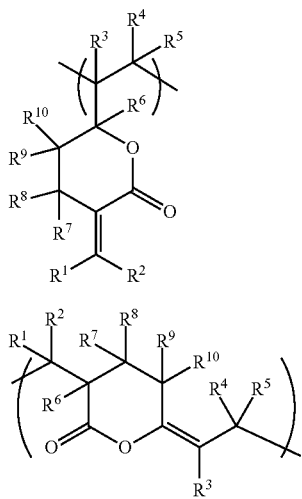
(II-a)

(III-a)

wherein, in Formula (II-a), $R^1$ to $R^{10}$ each independently represent a monovalent organic group, a halogen atom or a hydrogen atom; and in Formula (III-a), $R^1$ to $R^{10}$ each independently represent a monovalent organic group, a halogen atom or a hydrogen atom.

<5> The polymer according to any one of <1> to <3>, further comprising a structural unit represented by Formula (II) and/or a structural unit represented by Formula (III);

[Chemical formula 5]

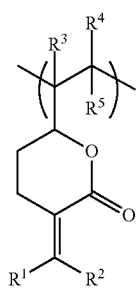
(II)

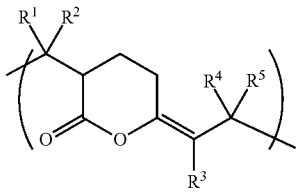
(III)

wherein, in Formula (II), $R^1$ to $R^5$ each independently represent a monovalent organic group, a halogen atom or a hydrogen atom; and in Formula (III), $R^1$ to $R^5$ each independently represent a monovalent organic group or a hydrogen atom.

<6> The polymer according to <1>, comprising a structural unit represented by Formula (I-a), a structural unit represented by Formula (II-a) and a structural unit represented by Formula (III-a):

[Chemical formula 6]

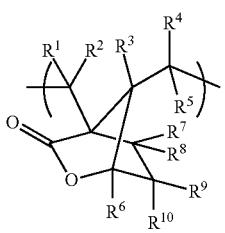
(I-a)

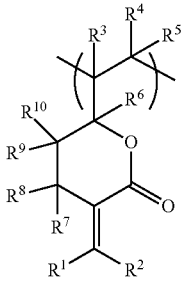
(II-a)

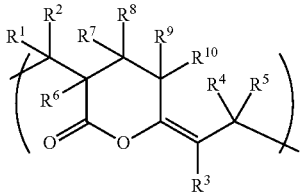
(III-a)

wherein, in Formula (I-a), $R^1$ to $R^{10}$ each independently represent a monovalent organic group, a halogen atom or a hydrogen atom; in Formula (II-a), $R^1$ to $R^{10}$ each independently represent a monovalent organic group, a halogen atom or a hydrogen atom; and in Formula (III-a), $R^1$ to $R^{10}$ each independently represent a monovalent organic group, a halogen atom or a hydrogen atom.

<7> The polymer according to <1>, comprising a structural unit represented by Formula (I), a structural unit represented by Formula (II) and a structural unit represented by Formula (III):

[Chemical formula 7]

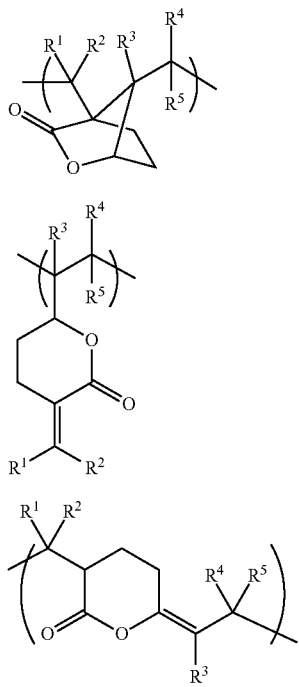

(I)

(II)

(III)

wherein, in Formula (I), $R^1$ to $R^5$ each independently represent a monovalent organic group, a halogen atom or a hydrogen atom; in Formula (II), $R^1$ to $R^5$ each independently represent a monovalent organic group, a halogen atom or a hydrogen atom; and in Formula (III), $R^1$ to $R^5$ each independently represent a monovalent organic group, a halogen atom or a hydrogen atom.

<8> A polymer comprising at least one of a structural unit represented by Formula (I-a), a structural unit represented by Formula (II-a) and a structural unit represented by Formula (III-a):

[Chemical formula 8]

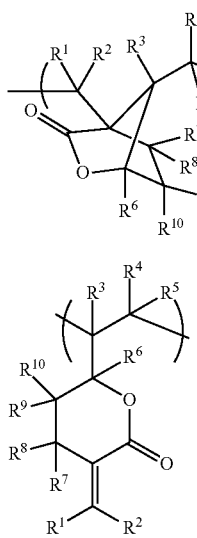

(I-a)

(II-a)

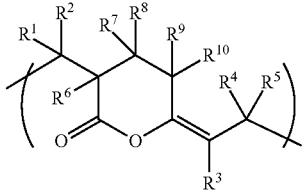

(III-a)

wherein, in Formula (I-a), $R^1$ to $R^{10}$ each independently represent a monovalent organic group, a halogen atom or a hydrogen atom; in Formula (II-a), $R^1$ to $R^{10}$ each independently represent a monovalent organic group, a halogen atom or a hydrogen atom; and in Formula (III-a), $R^1$ to $R^{10}$ each independently represent a monovalent organic group, a halogen atom or a hydrogen atom.

<9> A polymer obtained by radically homopolymerizing a compound represented by Formula (IV-a):

[Chemical formula 9]

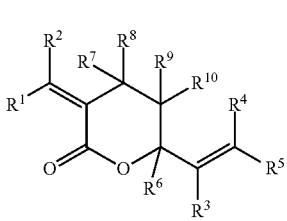

(IV-a)

wherein, in Formula (IV-a), $R^1$ to $R^{10}$ each independently represent a monovalent organic group, a halogen atom or a hydrogen atom.

<10> A polymer obtained by radically homopolymerizing a compound represented by Formula (IV):

[Chemical formula 10]

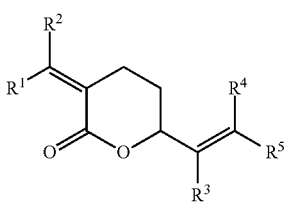

(IV)

wherein $R^1$ to $R^5$ each independently represent a monovalent organic group, a halogen atom or a hydrogen atom.

<11> The polymer according to any one of <1> to <10>, which has a thermal decomposition temperature (Td) of 220° C. or more as determined by thermogravimetry (TG) when it is heated at 10° C./min.

<12> A varnish comprising the polymer according to any one of <1> to <11>.

<13> A molded article comprising the polymer according to any one of <1> to <11>.

<14> A process for preparing a polymer, comprising polymerizing a starting monomer including a compound represented by Formula (IV-a) in such a manner that the rates of other reactions are lower than the rate of the homopolymerization reaction of the monomer:

[Chemical formula 11]

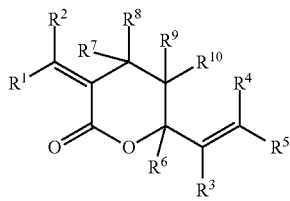

(IV-a)

wherein $R^1$ to $R^{10}$ each independently represent a monovalent organic group, a halogen atom or a hydrogen atom.
<15> A process for preparing a polymer, comprising polymerizing a starting monomer including a compound represented by Formula (IV) in such a manner that the rates of other reactions are lower than the rate of the homopolymerization reaction of the monomer:

[Chemical formula 12]

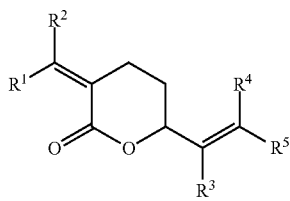

(IV)

wherein $R^1$ to $R^5$ each independently represent a monovalent organic group, a halogen atom or a hydrogen atom.
<16> The process for preparing a polymer according to <14> or <15>, comprising radically polymerizing the starting monomer in the presence of at least one Bronsted acid or Lewis acid or polymerizing it by emulsion polymerization.
<17> A process for preparing a polymer, comprising synthesizing it in one pot from a 1,3-diene compound and carbon dioxide.
<18> The process for preparing a polymer according to any one of <14> to <17>, wherein the polymer is the polymer according to any one of <1> to <11>.

Advantages of the Invention

The present invention makes it possible to provide polymers obtained by homopolymerizing lactone monomers.

BRIEF EXPLANATION OF THE DRAWINGS

FIG. 11 is a diagram showing the SEC chromatogram of the polymer of Example 5.

THE MOST PREFERRED EMBODIMENTS OF THE INVENTION

Figure 1:
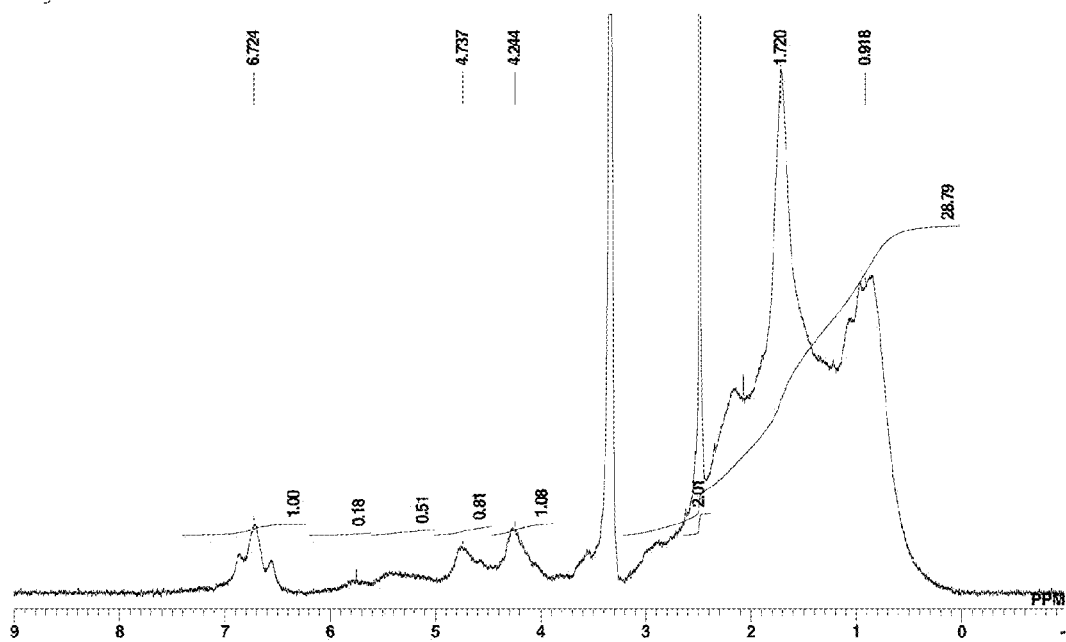
FIG. 1 is a diagram showing the $^1$H NMR spectrum of the polymer of Example 1

The present invention will be explained in detail below. As used herein, each numerical range expressed by two values on both sides of "to" is used to mean the range including the values indicated before and after "to" as lower and upper limits.

As used herein, any reference to a group (a group of atoms) without indicating that the group is substituted or unsubstituted means to include not only the group unsubstituted but also the group substituted.

Also as used herein, the terms "monomeric form" and "monomer" are synonymous. Monomers as used herein are distinguished from oligomers and polymers, and refer to compounds having a weight average molecular weight of 2,000 or less.

As used herein, polymers obtained by homopolymerizing lactone monomers are intended to mean not only those solely consisting of homopolymers but also those containing minor amounts of other monomers without departing from the spirit of the present invention.
<Polymers>

The polymers of the present invention comprise a structural unit having a lactone ring containing three or more carbon atoms (hereinafter sometimes simply referred to as a lactone ring), wherein at least one of the carbon atoms (except for C of —C(=O)O—) wherein at least one of the carbon atoms (except for C of —C(=O)O—) of the lactone ring forms a part of a main chain; and wherein at least one of the carbon atoms (except for C of —C(=O)O—) which forms the lactone ring and is other than the carbon atom(s) forming a part of the main chain is bridged with an atom of the main chain. The polymers of the present invention comprise a structural unit having a lactone ring containing three or more carbon atoms, wherein at least one of the carbon atoms (except for C of —C(=O)O—) of the lactone ring forms a part of the main chain. Further, the polymers of the present invention comprise the structural unit, wherein at least one of the carbon atoms (except for C of —C(=O) O—) which forms the lactone ring and is other than the carbon atom(s) forming a part of the main chain (hereinafter sometimes referred to as carbon atoms not forming a part of the main chain) is bridged with an atom of the main chain.

Thus, at least one of the carbon atoms except for C of —C(=O)O— of the lactone ring containing three or more carbon atoms forms a part of the main chain and at least one of carbon atoms not forming a part of the main chain among the carbon atoms of the lactone ring containing three or more carbon atoms is bridged with an atom of the main chain, whereby the heat resistance of the polymers can be improved. In other words, the polymers of the present invention have high thermal stability due to their rigid structure.

In the polymers of the present invention, at least one carbon atom except for C of —C(=O)O— among the carbon atoms forming the lactone ring containing three or more carbon atoms may form a part of the main chain, and preferably one carbon atom except for C of —C(=O)O— among the carbon atoms forming the lactone ring containing three or more carbon atoms forms a part of the main chain. In the polymers of the present invention, a carbon atom adjacent to C of —C(=O)O— among the carbon atom of the lactone ring preferably forms a part of the main chain.

In the polymers of the present invention, the lactone ring may contain three or more carbon atoms, preferably four or more carbon atoms, more preferably four or five carbon atoms. Preferably, the lactone ring containing three or more carbon atoms is, for example, a lactone ring forming a 5- to 8-membered ring, more preferably a lactone structure forming a 5- or 6-membered ring, still more preferably a lactone structure forming a 6-membered ring.

Further, the lactone ring containing three or more carbon atoms used in the present invention may be fused to another ring structure to form a polycyclic structure, but preferably the lactone ring is not fused to another ring structure.

Further, the polymers of the present invention comprise the structural unit having a lactone ring containing three or more carbon atoms, wherein at least one of the carbon atoms (except for C of —C(=O)O—) of the lactone ring excluding the carbon atom(s) forming a part of the main chain is bridged with an atom of the main chain.

The term "bridged" as used herein with reference to the polymers of the present invention means that at least one of carbon atoms not forming a part of the main chain among the carbon atoms forming the lactone ring (except for C of —C(=O)O—) may be bonded town atom of the main chain, and preferably at least one of carbon atoms not forming a part of the main chain is directly bonded to a carbon atom of the main chain.

In the polymers of the present invention, at least one of carbon atoms not forming a part of the main chain among the carbon atoms of the lactone ring containing three or more carbon atoms may be bridged with an atom of the main chain, and especially, only one of carbon atoms not forming a part of the main chain among the carbon atoms of the lactone ring is preferably bridged with an atom of the main chain.

Also in the polymers of the present invention, at least a carbon atom adjacent to O of —C(=O)O— among the carbon atoms of the lactone ring but not forming a part of the main chain is preferably bridged with a carbon atom of the main chain, and especially, only a carbon atom directly bonded to O of —C(=O)O— among the carbon atoms of the lactone ring is preferably bridged with a carbon atom of the main chain.

Preferably, the polymers of the present invention have a glass transition temperature (Tg) of 120° C. or more, more preferably 150° C. or more, still more preferably 170° C. or more as determined by differential scanning calorimetry (DSC) by heating at a rate of 20° C./min. Alternatively, the polymers of the present invention preferably have a glass transition temperature (Tg) of 30° C. or more, or preferably 50° C. or more, or preferably 70° C. or more as determined by differential scanning calorimetry (DSC) by heating at a rate of 20° C./min.

Preferably, the polymers of the present invention have a thermal decomposition temperature (Td) of 220° C. or more, more preferably 250° C. or more, still more preferably 300° C. or more as determined by thermogravimetry (TG) as the temperature at which the weight loss reaches 5% when the temperature is raised at a rate of 10° C./min in the temperature range of 40 to 500° C.

Preferably, the polymers of the present invention have a number average molecular weight (Mn) of 1,000 to 400,000, more preferably 3,000 to 300,000, still more preferably 5,000 to 200,000, especially preferably 5,000 to 100,000.

Preferably, the polymers of the present invention have a weight average molecular weight (Mw) of 2,000 to 800,000, more preferably 6,000 to 600,000, still more preferably 9,000 to 400,000, especially preferably 9,000 to 200,000.

When the polymers of the present invention have a number average molecular weight (Mn) and a weight average molecular weight (Mw) in the ranges defined above, they exhibit good thermal properties and can attain processability. When the polymers of the present invention have a number average molecular weight (Mn) and a weight average molecular weight (Mw) in the ranges defined above, the synthetic reaction need not be performed under harsh conditions such as very high temperature and long period.

The number average molecular weight (Mn) and weight average molecular weight (Mw) of the polymers of the present invention were determined by SEC (Size Exclusion Chromatography) under either condition (A) or (B) shown below.

<Condition (A)>
GPC instrument: HLC8220GPC (from Tosoh Corporation)
Columns: TSKgel SuperHZM-H, TSKgel SuperHZ-2000, and TSKgel SuperHZ-4000 (all from Tosoh Corporation)
Solvent: tetrahydrofuran
Flow rate: 0.35 ml/min
Column temperature: 40° C.
Mn and Mw are relative to standard polystyrene samples.
<Condition (B)>
GPC instrument: HLC8220GPC (from Tosoh Corporation)
Detector: Viscotek TDA302 (from Viscotek Corporation)
Columns: two connected columns of TSKgel Supermultipore HZ-N (from Tosoh Corporation)
Solvent: tetrahydrofuran
Flow rate: 0.35 ml/min
Column temperature: 40° C.
Mn and Mw are based on specific refractive index increments calculated from the RI chart by the OmniSec program (from Viscotek Corporation).

<<First Embodiment>>

Preferably, a polymer of the present invention comprises a structural unit represented by Formula (I-a) below, or may comprise substantially solely a structural unit represented by Formula (I-a) below. The expression "substantially solely a structural unit represented by Formula (I) below" here means that the amount of the structural unit represented by Formula (I-a) below in the polymer of the present invention is 99% by mass or more, preferably 100% by mass.

[Chemical formula 13]

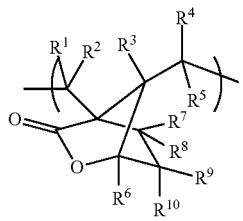

(I-a)

In Formula (I-a), $R^1$ to $R^{10}$ each independently represent a monovalent organic group, a halogen atom or a hydrogen atom.

In Formula (I-a), $R^1$ to $R^{10}$ each independently represent a monovalent organic group, a halogen atom or a hydrogen atom, preferably a monovalent organic group or a hydrogen atom.

The monovalent organic group is preferably a hydrocarbon group, more preferably a straight-chain or branched alkyl group, still more preferably a straight-chain alkyl group containing 1 to 3 carbon atoms, especially preferably a methyl group.

Preferably, the polymer of the present invention comprises a structural unit of Formula (I-a) wherein $R^1$ to $R^{10}$ each independently represent a straight-chain alkyl group containing 1 to 3 carbon atoms or a hydrogen atom, more preferably a methyl group or a hydrogen atom. Especially, $R^3$ to $R^6$ are preferably a hydrogen atom.

Especially, the polymer of the present invention preferably comprises a structural unit represented by Formula (I) below, or preferably comprise substantially solely a structural unit represented by Formula (I) below.

[Chemical formula 14]

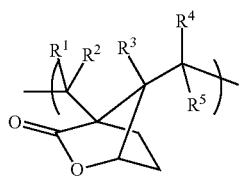

(I)

In Formula (I), $R^1$ to $R^5$ each independently represent a monovalent organic group, a halogen atom or a hydrogen atom.

In Formula (I), $R^1$ to $R^5$ each independently represent a monovalent organic group, a halogen atom or a hydrogen atom, preferably a monovalent organic group or a hydrogen atom.

The monovalent organic group is preferably a hydrocarbon group, more preferably a straight-chain or branched alkyl group, still more preferably a straight-chain alkyl group containing 1 to 3 carbon atoms, especially preferably a methyl group.

Preferably, the polymer of the present invention comprises a structural unit of Formula (I) wherein $R^1$ to $R^5$ each independently represent a straight-chain alkyl group containing 1 to 3 carbon atoms or a hydrogen atom, more preferably a methyl group or a hydrogen atom.

Especially, the polymer of the present invention preferably comprises a structural unit of Formula (I) wherein $R^1$ and $R^2$ represent a straight-chain alkyl group containing 1 to 3 carbon atoms, and $R^3$ to $R^5$ each represent a hydrogen atom.

The polymer of the present invention may comprise structural units other than the structural unit represented by Formula (I-a).

For example, the polymer of the present invention may comprise a structural unit represented by Formula (II-1) below.

[Chemical formula 15]

$$-\!\!\left(X\right)\!\!-$$ (II-1)

In Formula (II-1), X represents any structural unit.

In Formula (II-1), X represents any structural unit without any specific limitations, but preferably a structural unit consisting of a radically polymerizable monomer. Radically polymerizable monomers include, for example, acrylic acid esters such as methyl acrylate, butyl acrylate, 2-hydroxyethyl acrylate; methacrylic acid esters such as methyl methacrylate, 2-ethylhexyl methacrylate, lauryl methacrylate; aromatic unsaturated hydrocarbons such as styrene, alpha-methylstyrene; unsaturated carboxylic acids such as acrylic acid, methacrylic acid, itaconic acid, maleic acid; conjugated aliphatic dienes such as butadiene, isoprene, chloroprene; and vinyl esters such as vinyl acetate, vinyl propionate.

The amount of the structural unit represented by Formula (II-1) below contained in the polymer of the present invention can be 0 to 10 mol %, or can be 0 to 5 mol %, or can be 1 mol % or less based on all structural units.

<<Second Embodiment>>

A polymer of the present invention may further comprise a structural unit represented by Formula (II-a) below and/or a structural unit represented by Formula (III-a) below, in addition to the structural unit represented by Formula (I-a).

[Chemical formula 16]

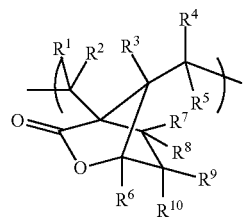

(I-a)

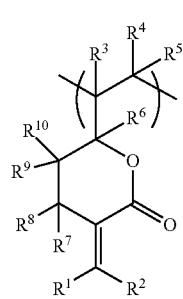

(II-a)

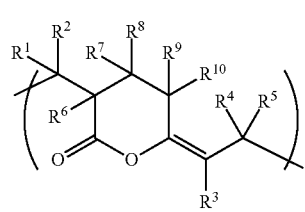

(III-a)

In Formula (I-a), $R^1$ to $R^{10}$ each independently represent a monovalent organic group, a halogen atom or a hydrogen atom. In Formula (II-a), $R^1$ to $R^{10}$ each independently represent a monovalent organic group, a halogen atom or a hydrogen atom. In Formula (III-a), $R^1$ to $R^{10}$ each independently represent a monovalent organic group, a halogen atom or a hydrogen atom.

In Formula (II-a), $R^1$ to $R^{10}$ each independently represent a monovalent organic group, a halogen atom or a hydrogen atom, as defined for $R^1$ to $R^{10}$ in Formula (I-a), and also cover the same preferred ranges.

In Formula (III-a), $R^1$ to $R^{10}$ each independently represent a monovalent organic group, a halogen atom or a hydrogen atom, as defined for $R^1$ to $R^{10}$ in Formula (I-a) above, and also cover the same preferred ranges.

Especially, the polymer of the present invention preferably further comprises a structural unit represented by Formula (II) below and/or a structural unit represented by Formula (III) below, in addition to the structural unit represented by Formula (I) above.

[Chemical formula 17]

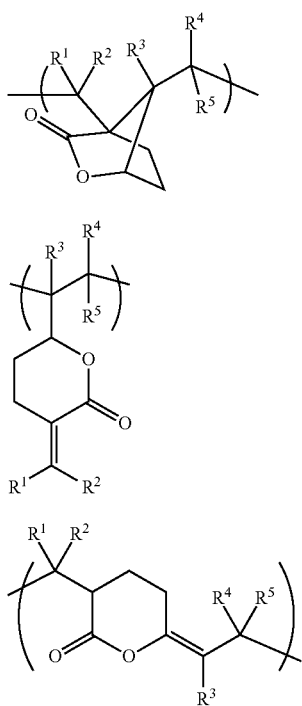

In Formula (I), $R^1$ to $R^5$ each independently represent a monovalent organic group, a halogen atom or a hydrogen atom. In Formula (II), $R^1$ to $R^5$ each independently represent a monovalent organic group, a halogen atom or a hydrogen atom. In Formula (III), $R^1$ to $R^5$ each independently represent a monovalent organic group or a hydrogen atom.

In Formula (II), $R^1$ to $R^5$ each independently represent a monovalent organic group, a halogen atom or a hydrogen atom, as defined for $R^1$ to $R^5$ in Formula (I) above, and also cover the same preferred ranges. In Formula (III), $R^1$ to $R^5$ each independently represent a monovalent organic group or a hydrogen atom, as defined for $R^1$ to $R^5$ in Formula (I) above, and also cover the same preferred ranges.

The amount of the structural unit represented by Formula (I-a) or Formula (I) contained in the polymer of the present invention can be 0.1 to 100 mol %, or can be 1 to 100 mol %, or can be 5 to 100 mol % based on all structural units in the polymer of the present invention.

The amount of the structural unit represented by Formula (II-a) or Formula (II) contained in the polymer of the present invention can be 0 to 99.9 mol %, or can be 0 to 99 mol %, or can be 0 to 95 mol % based on all structural units in the polymer of the present invention.

The amount of the structural unit represented by Formula (III-a) or Formula (III) contained in the polymer of the present invention can be 0 to 95 mol %, or can be 0 to 99 mol %, or can be 0 to 95 mol %.

The polymer of the present invention may further comprise the structural unit represented by Formula (II-1) described above as a structural unit other than the structural units represented by Formulae (I-a) to (III-a).

The amount of the structural unit represented by Formula (II-1) contained in the polymer of the present invention can be 0 to 10 mol %, or can be 0 to 5 mol %, or can be 1 mol % or less based on all structural units.

More detailed examples of polymers according to the second embodiment are explained below.

<<Polymer 2-1>>

Preferably, a polymer of the present invention comprises three structural units represented by Formula (A0) below, or preferably comprise substantially solely three structural units represented by Formula (A0) below. The expression "substantially solely structural units represented by Formula (A0) below" here means that the sum of l, m and n in the structural units represented by Formula (A0) below is 99 mol % or more, preferably 100 mol % provided that the amount of all structural units in the polymer of the present invention is 100 mol %.

[Chemical formula 18]

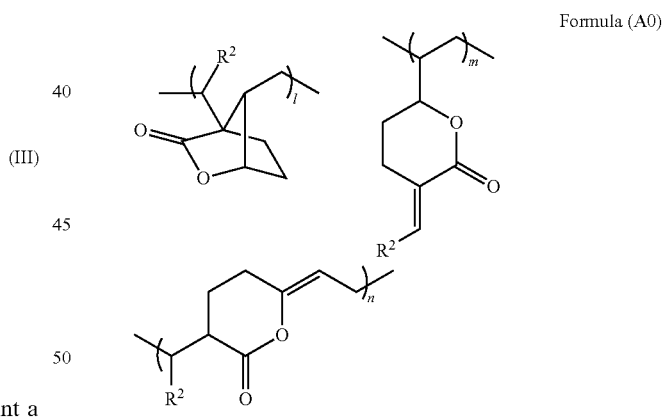

In Formula (A0), $R^2$ represents an alkyl group. l, m, and n represent the numbers of the respective structural units in their molar ratio. In Formula (A0), $R^2$ preferably represents a straight-chain alkyl group containing 1 to 3 carbon atoms, more preferably a methyl group.

When the sum of l, m and n is 100 mol %, l can be 0.1 to 100 mol %, or can be 1 to 100 mol %, or can be 5 to 100 mol %.

When the sum of l, m and n is 100 mol %, m can be 0 to 99.9 mol %, or can be 0 to 99 mol %, or can be 0 to 95 mol %.

When the sum of l, m and n is 100 mol %, n can be 0 to 95 mol %, or can be 0 to 99 mol %, or can be 0 to 95 mol %.

<<Polymer 2-2>>

Alternatively, a polymer of the present invention preferably comprises five structural units represented by Formula (A1) below, or preferably comprise substantially solely five structural units represented by Formula (A1) below. The expression "substantially solely structural units represented by Formula (A1) below" here means that the sum of l1, l2, m1, m2 and n1 in the structural units represented by Formula (A1) below is 99 mol % or more, preferably 100 mol % provided that the amount of all structural units in the polymer of the present invention is 100 mol %.

[Chemical formula 19]

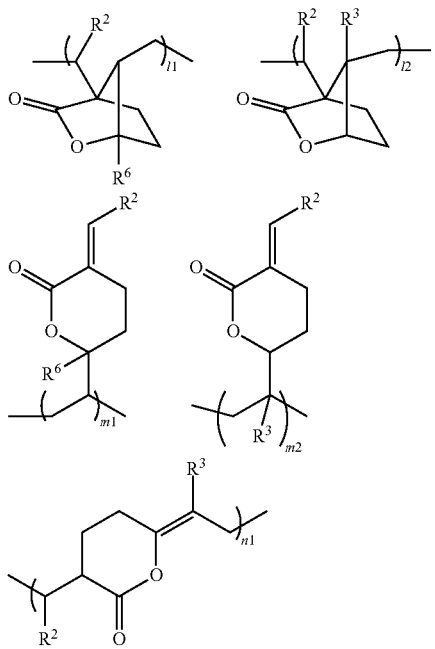

Formula (A1)

In Formula (A1), $R^2$, $R^3$ and $R^6$ each independently represent an alkyl group. l1, l2, m1, m2 and n1 represent the numbers of the respective structural units in their molar ratio.

In Formula (A1), $R^2$, $R^3$ and $R^6$ preferably represent a straight-chain alkyl group containing 1 to 3 carbon atoms, more preferably a methyl group.

When the sum of l1, l2, m1, m2 and n1 is 100 mol %, l1 and l2 can each independently be 0 to 100 mol %, or can be 0 to 99 mol %. When the sum of l1, l2, m1, m2 and n1 is 100 mol %, m1 and m2 can each independently be 0 to 99.9 mol %, or can be 0 to 99 mol %, or can be 0 to 95 mol %.

When the sum of l1, l2, m1, m2 and n1 is 100 mol %, n1 can be 0 to 95 mol %, or can be 0 to 99 mol %, or can be 0 to 95 mol %.

<<Polymer 2-3>>>

Alternatively, a polymer of the present invention preferably comprises three structural units represented by Formula (A2) below, or preferably comprise substantially solely three structural units represented by Formula (A2) below. The expression "substantially solely structural units represented by Formula (A2) below" here means that the sum of l3, m3 and n2 in the structural units represented by Formula (A2) below is 99 mol % or more, preferably 100 mol % provided that the amount of all structural units in the polymer of the present invention is 100 mol %.

[Chemical formula 20]

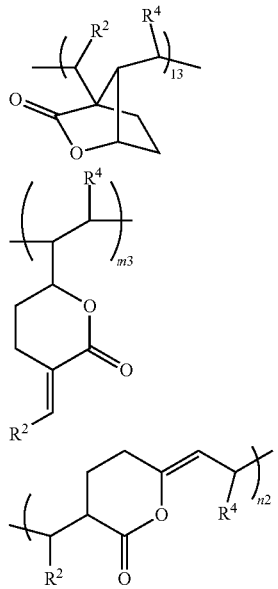

Formula (A2)

In Formula (A2), $R^2$ and $R^4$ each independently represent an alkyl group. l3, m3 and n2 represent the numbers of the respective structural units in their molar ratio.

In Formula (A2), $R^2$ and $R^4$ preferably represent a straight-chain alkyl group containing 1 to 3 carbon atoms, more preferably a methyl group.

In Formula (A2), l3, m3 and n2 represent the numbers of the respective structural units in their molar ratio, as defined above for m, l and n in Formula (A0).

<<Polymer 2-4>>

Alternatively, a polymer of the present invention preferably comprises two structural units represented by Formula (A3) below, or preferably comprise substantially solely two structural units represented by Formula (A3) below. The expression "substantially solely structural units represented by Formula (A3) below" here means that the sum of l4 and m4 in the structural units represented by Formula (A2) below is 99 mol % or more, preferably 100 mol % provided that the amount of all structural units in the polymer of the present invention is 100 mol %.

[Chemical formula 21]

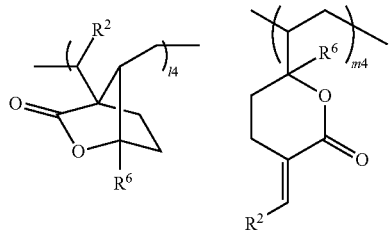

Formula (A3)

In Formula (A3), $R^2$ and $R^6$ each independently represent an alkyl group. l4 and m4 represent the numbers of the respective structural units in their molar ratio.

In Formula (A3), $R^2$ and $R^6$ preferably represent a straight-chain alkyl group containing 1 to 3 carbon atoms, more preferably a methyl group.

When the sum of m4 and l4 is 100 mol %, l4 can be 0.1 to 100 mol %, or can be 1 to 100 mol %, or can be 5 to 100 mol %.

When the sum of m4 and l4 is 100 mol %, m4 can be 0 to 99.9 mol %, or can be 0 to 99 mol %, or can be 0 to 95 mol %.

<<Polymer 2-5>>

Alternatively, a polymer of the present invention preferably comprises two structural units represented by Formula (A4) below, or preferably comprise substantially solely two structural units represented by Formula (A4) below. The expression "substantially solely structural units represented by Formula (A4) below" here means that the sum of l5 and m5 in the structural units represented by Formula (A4) below is 99 mol % or more, preferably 100 mol % provided that the amount of all structural units in the polymer of the present invention is 100 mol %.

[Chemical formula 22]

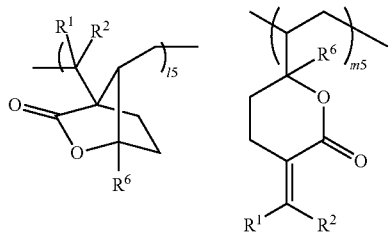

Formula (A4)

In Formula (A4), $R^1$, $R^2$ and $R^6$ each independently represent an alkyl group. l5 and m5 represent the numbers of the respective structural units in their molar ratio.

In Formula (A4), $R^1$, $R^2$ and $R^6$ preferably represent a straight-chain alkyl group containing 1 to 3 carbon atoms, more preferably a methyl group.

When the sum of l5 and m5 is 100 mol %, l5 can be 0.1 to 100 mol %, or can be 1 to 100 mol %, or can be 5 to 100 mol %.

When the sum of l5 and m5 is 100 mol %, m5 can be 0 to 99.9 mol %, or can be 0 to 99 mol %, or can be 0 to 95 mol %.

<<Third Embodiment>>

A polymer of the present invention may comprise at least one of the structural unit represented by Formula (II-a) and the structural unit represented by Formula (III-a) in place of the structural unit represented by Formula (I-a).

The amount of the structural unit represented by Formula (II-a) contained in the polymer of the present invention can be 0 to 99.9 mol %, or can be 0 to 99 mol %, or can be 0 to 95 mol % based on all structural units in the polymer of the present invention.

The amount of the structural unit represented by Formula (III-a) contained in the polymer of the present invention can be 0 to 95 mol %, or can be 0 to 99 mol %, or can be 0 to 95 mol %.

The polymer of the present invention may further comprise the structural unit represented by Formula (II-1) described above as a structural unit other than the structural unit represented by Formula (II-a) and the structural unit represented by Formula (III-a).

The amount of the structural unit represented by Formula (II-1) contained in the polymer of the present invention can be 0 to 10 mol %, or can be 0 to 5 mol %, or can be 1 mol % or less based on all structural units.

More detailed examples of polymers according to the third embodiment are explained below.

<<Polymer 3-1>>

A polymer of the present invention may comprise substantially solely three structural units represented by Formula (A5) below. The expression "substantially solely structural units represented by Formula (A5) below" here means that the sum of m1, m2 and n1 in the structural units represented by Formula (A5) below is 99 mol % or more, preferably 100 mol % provided that the amount of all structural units in the polymer of the present invention is 100 mol %

[Chemical formula 23]

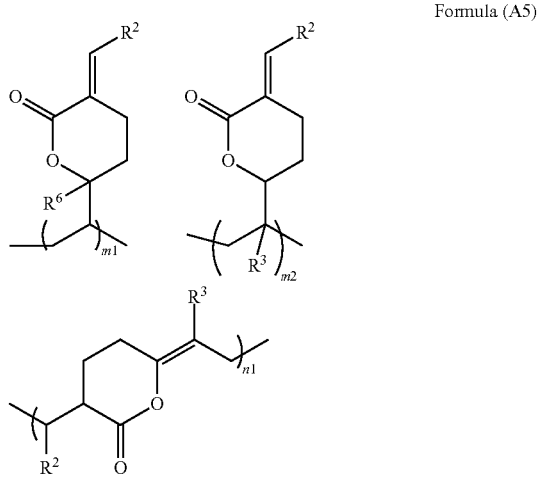

Formula (A5)

In Formula (A5), $R^2$, W and $R^6$ each independently represent an alkyl group. m1, m2 and n1 represent the numbers of the respective structural units in their molar ratio.

In Formula (A5), $R^2$, $R^3$ and $R^6$ preferably represent a straight-chain alkyl group containing 1 to 3 carbon atoms, more preferably a methyl group.

When the sum of m1, m2, and n1 is 100 mol %, m1 and m2 can each independently be 0 to 99.9 mol %, or can be 1 to 99 mol %, or can be 1 to 95 mol %.

When the sum of m1, m2 and n1 is 100 mol %, n1 can be 0 to 95 mol %, or can be 1 to 99 mol %, or can be 1 to 95 mol %.

<Processes for Preparing the Polymers>

Processes for preparing the polymers of the present invention comprise polymerizing a starting monomer including a compound represented by Formula (IV-a) below in such a manner that the rates of other reactions are lower than the rate of the homopolymerization reaction of the starting monomer.

[Chemical formula 24]

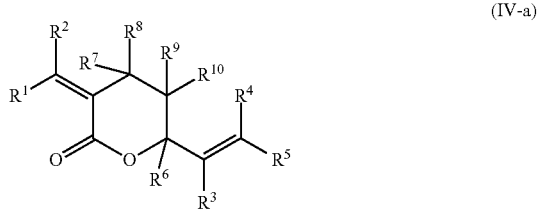

(IV-a)

In Formula (IV-a), $R^1$ to $R^{10}$ each independently represent a monovalent organic group, a halogen atom or a hydrogen atom.

In Formula (IV-a), $R^1$ to $R^{10}$ each independently represent a monovalent organic group, a halogen atom or a hydrogen atom, as defined for $R^1$ to $R^{10}$ in Formula (I-a) above, and also cover the same preferred ranges.

Especially, the processes for preparing the polymers of the present invention preferably comprise polymerizing a starting monomer including a compound represented by Formula (IV) below in such a manner that the rates of other reactions are lower than the rate of the homopolymerization reaction of the starting monomer.

[Chemical formula 25]

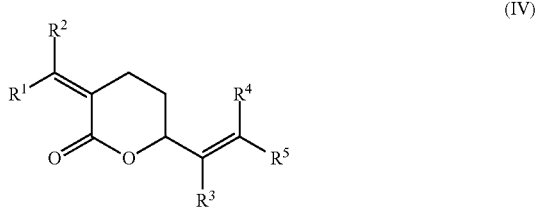

(IV)

In Formula (IV), $R^1$ to $R^5$ each independently represent a monovalent organic group, a halogen atom or a hydrogen atom.

In Formula (IV), $R^1$ to $R^5$ each independently represent a monovalent organic group, a halogen atom or a hydrogen atom, as defined for $R^1$ to $R^5$ in Formula (I) above, and also cover the same preferred ranges.

The inventors of the invention of the present application found that monomers including a compound represented by Formula (IV-a) above can be homopolymerized via radical polymerization by applying the processes for preparing the polymers of the present invention, contrary to previous studies that had found difficulty in homopolymerizing them.

The reason for this is supposed as follows: starting monomers including a compound represented by Formula (IV-a) above can be homopolymerized by reducing at least one of factors involved in the termination of the polymerization reaction during the preparation of the polymers of the present invention, i.e., the inhibition by the presence of stable isomers of lactones known as impurities and the polymerization termination reaction via chain transfer (degradative chain transfer), with the result that the polymers of the present invention described above can be obtained.

The polymers of the present invention are those obtained by radically homopolymerizing a compound represented by Formula (IV-a) above. The expression "homopolymerizing a compound represented by Formula (IV-a) above" here means that the compound represented by Formula (IV-a) above preferably accounts for substantially the whole of the starting monomer. The expression "substantially the whole of the starting monomer" here means that the compound represented by Formula (IV-a) above preferably accounts for 99 mol % or more of the starting monomer, and more preferably the compound represented by Formula (IV-a) above accounts for 100 mol % of the starting monomer. Especially, the compound represented by Formula (IV) above preferably accounts for 99 mol % or more of the starting monomer, and more preferably the compound represented by Formula (IV) above accounts for 100 mol % of the starting monomer.

The polymers obtained by the processes for preparing the polymers of the present invention can be obtained by polymerizing a starting monomer including, for example, a compound represented by Formula (IV-a) above, which can be directly obtained from butadiene and carbon dioxide. Butadiene here can be synthesized from even plant materials. Thus, the polymers obtained by the processes for preparing the polymers of the present invention are also preferred for environmental protection because they can be used as plastic materials that are not dependent on fossil fuels. The compound represented by Formula (IV-a) can be synthesized by referring to, for example, J. Organomet. Chem. 1983, 255, 263-268.

<<First Embodiment>>

A process for preparing a polymer of the present invention preferably comprises polymerizing a starting monomer including a compound represented by Formula (IV-a) above by emulsion polymerization. Such a process makes it possible to effectively reduce the inhibition by the presence of stable isomers of lactones known as impurities among the factors involved in the termination of the polymerization reaction during the preparation of the polymers of the present invention described above, thereby effectively affording the polymers of the present invention described above, especially the polymers solely comprising a structural unit represented by Formula (I-a) above.

The polymerization reaction in the process for preparing a polymer of the present invention suffers a significant decrease in the yield and molecular weight by the presence of stable isomers of a compound represented by Formula (IV-a) above (e.g., stable isomers of a lactone). To obtain the polymers of the present invention described above, not only the purity of the starting monomer (the starting monomer including a compound represented by Formula (IV-a) above) should preferably be increased, but also the rates of other reactions should preferably be lower than the rate of the homopolymerization reaction of the starting monomer.

Stable isomers of lactones are known to be produced by thermal isomerization during polymerization. However, the polymerization reaction in the process for preparing a polymer of the present invention requires a relatively high temperature (e.g., a temperature higher than 80° C.) because the reactivity (polymerization activity) of the starting monomer is very low. The emulsion polymerization used in the process for preparing a polymer of the present invention is especially excellent in the rate of the polymerization reaction among radical polymerization techniques. The process for preparing a polymer of the present invention comprises polymerizing a starting monomer including a compound represented by Formula (IV-a) above by emulsion polymerization, whereby the relative rate of thermal isomerization of the starting monomer to the rate of the homopolymerization reaction of the starting monomer can be decreased, which may effectively reduce the production of stable isomers and thus achieve a high conversion yield, with the result that the polymers of the present invention described above can be obtained.

The emulsion polymerization in the process for preparing a polymer of the present invention preferably comprises polymerizing an emulsion containing, for example, a starting monomer, an emulsifier and a polymerization initiator with stirring at, for example, 70 to 200° C., preferably 80 to 150° C. for 1 hour or more, preferably 24 hours or more, and washing the reaction mixture with a dispersion medium.

The starting monomer used is a compound represented by Formula (IV-a) above, preferably a compound represented by Formula (IV-a) above alone, and more preferably the compound represented by Formula (IV-a) above accounts for substantially the whole of the starting monomer. Especially, a starting monomer containing 99 mol % or more of a compound represented by Formula (IV-a) above is preferably polymerized, and more preferably a starting monomer containing 100 mol % of a compound represented by Formula (IV-a) above is polymerized.

The emulsifier is not specifically limited, and any of anionic surfactants, nonionic surfactants, cationic surfactants, and amphoteric surfactants can be used, but anionic surfactants are especially preferred because of the emulsion stability.

Anionic surfactants that can be used include, for example, fatty acid salts such as sodium lauryl sulfate; higher alcohol sulfate ester salts; alkyl benzenesulfonic acid salts such as sodium dodecylbenzene sulfonate; polyoxyethylene alkyl ether sulfuric acid salts, ammonium polyoxynonylphenyl ether sulfonate, polyoxyethylene-polyoxypropylene glycol ether sulfuric acid salts. Other surfactants that can be used can be found in, for example, paragraphs 0038 to 0050 of JP-A2008-33148, the disclosure of which is incorporated herein by reference.

The amount of the surfactants used for the emulsion polymerization of the polymers of the present invention is preferably 0.1 to 100 moles, more preferably 1 to 10 moles when the total amount of the starting monomer is 100 moles.

Polymerization initiators that can be used may have the ability to generate free radicals, and include, for example, inorganic peroxides such as persulfate salts and hydrogen peroxide; the peroxides described in the organic peroxides catalog from NOF CORPORATION and the like; and the azo compounds described in the azo initiators catalog from Wako Pure Chemical Industries, Ltd. and the like. Among them, preferred are water-soluble peroxides such as persulfate salts and the water-soluble azo compounds described in the azo initiators catalog from Wako Pure Chemical Industries, Ltd. and the like, more preferably ammonium persulfate, sodium persulfate, potassium persulfate, azobis(2-methylpropionamidine) hydrochloride, azobis(2-methyl-N-(2-hydroxyethyl)propionamide), or azobiscyanovaleric acid, especially preferably peroxides such as ammonium persulfate, sodium persulfate, or potassium persulfate. The amount of the polymerization initiators used for the emulsion polymerization of the polymers of the present invention is preferably 0.01 to 10 moles, more preferably 0.1 to 5 moles when the total amount of the starting monomer is 100 moles.

The dispersion medium is preferably water or a mixture of water and an aqueous solvent. Especially preferred aqueous solvents are, for example, lower aliphatic alcohols, aromatic alcohols, polyalcohols and alkyl ether derivatives of polyalcohols, or lower ketones, more preferably lower aliphatic alcohols.

Specific examples include straight-chain or branched lower aliphatic alcohols such as methanol, ethanol, n-propanol, 2-propanol, or t-butyl alcohol; aromatic alcohols such as benzyl alcohol, or 2-phenylethanol; propylene glycol, ethylene glycol; polyethylene glycols such as diethylene glycol, triethylene glycol, tetraethylene glycol, PEG200, or PEG400; polypropylene glycols such as dipropylene glycol, tripropylene glycol; polyalcohols such as 1,3-butanediol, 2,3-butanediol, 1,4-butanediol, 1,5-pentanediol, or hexylene glycol; and alkyl ether derivatives of polyalcohols or alkyl ether derivatives of alcohols such as ethylene glycol monomethyl ether, ethylene glycol monoethyl ether, ethylene glycol dimethyl ether, ethylene glycol diethyl ether, 3-methyl-3-methoxybutanol, diethylene glycol monomethyl ether, diethylene glycol monoethyl ether, diethylene glycol dimethyl ether, diethylene glycol diethyl ether, triethylene glycol monomethyl ether, triethylene glycol monoethyl ether, triethylene glycol dimethyl ether, triethylene glycol diethyl ether, dipropylene glycol monomethyl ether, dipropylene glycol monoethyl ether, ethylene glycol monomethyl ether acetate, or ethylene glycol monoethyl ether acetate; or lower ketones such as acetone.

Among them, preferred are methanol, ethanol, n-propanol, 2-propanol, ethylene glycol monomethyl ether, diethylene glycol dimethyl ether, propylene glycol monomethyl ether, diethylene glycol dimethyl ether, acetone, dipropylene glycol, or 3-methyl-3-methoxybutanol, especially preferably methanol.

The amount of the aqueous solvents used for the emulsion polymerization of the polymers of the present invention is preferably 0 to 50% by mass, more preferably 0 to 10% by mass based on the total amount of solvents for the emulsion polymerization.

<<Second Embodiment>>

A process for preparing a polymer of the present invention preferably comprises radically polymerizing a compound represented by Formula (IV-a) above in the presence of at least one Bronsted acid or Lewis acid. Such a process makes it possible to efficiently obtain the polymers of the present invention described above, for example, the polymer 2-1. It also makes it possible to efficiently obtain the polymers comprising a structural unit represented by Formula (I) above, a structural unit represented by Formula (II) above and a structural unit represented by Formula (III) above. The reason for this is supposed as follows: the addition of at least one Bronsted acid or Lewis acid can reduce the polymerization termination reaction via chain transfer of an allyl ester moiety as a partial structure of a monomer represented by Formula (IV-a) above (the "C(=O)O—C—$CR^3$=$CR^4R^5$" moiety in Formula (IV-a) above). Further, the radical polymerization in the presence of at least one Bronsted acid or Lewis acid not only can reduce the polymerization termination reaction via chain transfer of the allyl ester moiety but also allows the allyl ester moiety to be polymerized. As a result, the relative rates of side reactions to the rate of the polymerization reaction of the compound represented by Formula (IV-a) above decrease, and the yield and the overall molecular weight of the resulting polymer greatly improve, whereby the polymers of the present invention described above can be obtained.

The radical polymerization in the process for preparing a polymer of the present invention preferably comprises polymerizing a solution containing, for example, a starting monomer, a polymerization initiator and a dispersion medium in the presence of at least one Bronsted acid or Lewis acid with stirring at 70 to 200° C., preferably 80 to 150° C. for 3 hours or more, preferably 24 hours or more, and then washing the reaction mixture with a dispersion medium.

The polymerization technique in the present invention is not specifically limited so far as it is radical polymerization, and known polymerization techniques can be employed. For example, they include thermal radical polymerization, photo-induced radical polymerization, living radical polymerization and the like, among which thermal radical polymerization is preferred because of the conversion yield of the reaction.

Bronsted acids include, for example, hydrogen chloride, hydrogen bromide, hydrogen iodide, acetic acid, trifluoroacetic acid, phosphoric acid, phosphoric acid esters, sulfuric acid, nitric acid, benzenesulfonic acid, p-toluenesulfonic acid and the like. Lewis acids include, for example, aluminum trichloride, ethylaluminum dichloride, ethylaluminum sesquichloride, ethylaluminum chloride, ethoxyaluminum dichloride, triethylaluminum, aluminum triiodide, aluminum tribromide, antimony hexachloride, triethylaluminum, tetraethoxyzirconium, tetra-t-butoxyzirconium, zirconium tetraacetylacetonate, tin tetrachloride, antimony trichloride, iron trichloride, titanium tetrachloride, zinc chloride, mercury dichloride, cadmium dichloride, boron trifluoride, boron trichloride, boron tribromide, boron triiodide and reaction products of these Lewis acids with water and the like. These can be used alone or as a combination of two or more of them. Among these Bronsted acids, acetic acid is preferred because of the molecular weight. Among these Lewis acids, zinc chloride is preferred because of the polymerization yield and the molecular weight.

The Bronsted acids or Lewis acids are preferably used in an amount of 1 to 300 moles, more preferably 20 to 200 moles, still more preferably 50 to 180 moles when the total amount of the starting monomer is 100 moles.

The starting monomer is as defined for the starting monomer in the first embodiment described above, and also covers the same preferred ranges.

The polymerization initiator is as defined for the polymerization initiator in the first embodiment described above, and preferably an azo compound and a water-soluble azo compound. The amount of the polymerization initiator used for the emulsion polymerization of the polymers of the present invention is preferably 0.01 to 10 moles, more preferably 0.1 to 5 moles when the total of the starting monomer is 100 moles.

Dispersion media that can be used include those in the process according to the first embodiment described above. Other dispersion media include, for example, n-propyl alcohol, i-propyl alcohol, n-butyl alcohol, t-butyl alcohol, cyclohexanol, ethylene glycol monomethyl ether, ethylene glycol monoethyl ether, ethylene glycol mono-n-propyl ether, ethylene glycol mono-n-butyl ether, diethylene glycol dimethyl ether, diethylene glycol diethyl ether, diethylene glycol di-n-propyl ether, diethylene glycol di-n-butyl ether, ethylene glycol monomethyl ether acetate, ethylene glycol monoethyl ether acetate, ethylene glycol mono-n-propyl ether acetate, propylene glycol, propylene glycol monomethyl ether, propylene glycol monoethyl ether, propylene glycol mono-n-propyl ether, ethyl 2-hydroxy-2-methylpropionate, ethyl ethoxyacetate, ethyl hydroxyacetate, methyl 2-hydroxy-3-methylbutyrate, 3-methoxybutyl acetate, 3-methyl-3-methoxybutyl acetate, 3-methyl-3-methoxybutyl propionate, 3-methyl-3-methoxybutyl butyrate, ethyl acetate, n-propyl acetate, n-butyl acetate, methyl acetoacetate, ethyl acetoacetate, methyl pyruvate, ethyl pyruvate, N-methylpyrrolidone, N,N-dimethylformamide, N,N-dimethylacetamide, benzyl ethyl ether, di-n-hexyl ether, ethylene glycol monomethyl ether, diethylene glycol monoethyl ether, γ-butyrolactone, toluene, xylene, caproic acid, caprylic acid, octane, decane, 1-octanol, 1-nonanol, benzyl alcohol, benzyl acetate, ethyl benzoate, diethyl oxalate, diethyl maleate, ethylene carbonate, propylene carbonate and the like. Among these dispersion media, ethylene carbonate is preferred because of the yield. The dispersion media listed above can be used alone or as a mixture of two or more of them.

<<Third Embodiment>>

The polymers of the present invention can be synthesized in one pot from a 1,3-diene compound and carbon dioxide. The expression "synthesized in one pot" means that the polymerization of a compound represented by Formula (IV-a) above (a starting monomer), for example, starts without purifying it after it has been synthesized. The polymers of the present invention can be obtained directly from, for example, butadiene and carbon dioxide. They can be plastic materials that are not dependent on fossil fuels because butadiene can be synthesized from even plant materials.

For example, the polymers 2-1 to 2-5 or polymer 3-1 described above can be synthesized in one pot from at least one member selected from 1,3-butadiene, 1,3-pentadiene and isoprene with carbon dioxide.

Specifically, the polymer 2-1 described above can be obtained by polymerizing a compound represented by Formula (IV-a) below obtained from 1,3-butadiene and carbon dioxide.

[Chemical formula 26]

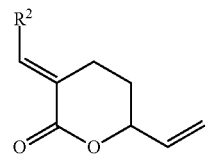

Formula (IV-a)

In Formula (IV-a), $R^2$ has the same meaning as defined for $R^2$ in Formula (A0), and also covers the same preferred ranges.

Further, the polymer 2-2 or polymer 3-1 described above can be obtained by polymerizing a mixture containing a compound represented by Formula (IV-b1) below and a compound represented by Formula (IV-b2) below obtained from 1,3-butadiene, isoprene and carbon dioxide.

[Chemical formula 27]

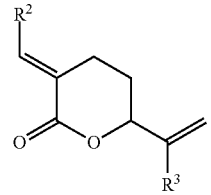

Formula (IV-b1)

In Formula (IV-b1), $R^2$ and $R^3$ have the same meanings as defined for $R^2$ and $R^3$ in Formula (A1), and also cover the same preferred ranges.

[Chemical formula 28]

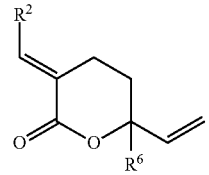

Formula (IV-b2)

In Formula (IV-b2), $R^2$ and $R^6$ have the same meanings as defined for $R^2$ and $R^6$ in Formula (A1), and also cover the same preferred ranges.

Further, the polymer 2-3 described above can be obtained by polymerizing a compound represented by Formula (IV-c) below obtained from 1,3-butadiene, 1,3-pentadiene and carbon dioxide.

[Chemical formula 29]

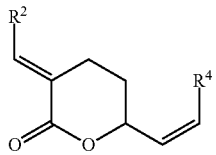

Formula (IV-c)

In Formula (IV-c), $R^2$ and $R^4$ have the same meanings as defined for $R^2$ and $R^4$ in Formula (A2), and also cover the same preferred ranges.

Further, the polymer 2-4 described above can be obtained by polymerizing a compound represented by Formula (IV-d) below obtained as a single product from 1,3-butadiene, isoprene and carbon dioxide.

[Chemical formula 30]

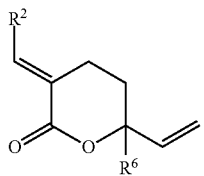

Formula (IV-d)

In Formula (IV-d), $R^2$ and $R^6$ have the same meanings as defined for $R^2$ and $R^6$ in Formula (A3), and also cover the same preferred ranges.

Further, the polymer 2-5 described above can be obtained by polymerizing a compound represented by Formula (IV-e) below obtained as a single product from isoprene and carbon dioxide.

[Chemical formula 31]

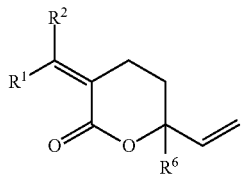

Formula (IV-e)

In Formula (IV-e), $R^1$, $R^2$ and $R^6$ have the same meanings as defined for $R^1$, $R^2$ and $R^6$ in Formula (A4), and also cover the same preferred ranges.

<<Applications for Use of the Polymers of the Present Invention>>

The polymers of the present invention can be used for various applications. The polymers of the present invention can be used as, for example, varnishes by dissolving them in organic solvents. Further, these varnishes can be used as solutions to form molded articles. The molded articles can be in shapes including, but not specifically limited to, films (coating films, transparent films and the like), sheets, tubes (tubes (e.g., JP-A2005-002531) and hoses), electronic device housings and the like. The polymers of the present invention can also be formed into molded articles by melt molding.

When the polymers of the present invention are to be formed into the molded articles described above, additives may be used with the polymers. Additives that can be used include, for example, mold release agents, antioxidants, UV inhibitors, flame retardants, stabilizers and the like.

The molded articles obtained by using the polymers of the present invention exhibit good transparency. For example, the haze value of the molded articles obtained by using the polymers of the present invention can be 5% or less, or can be 3% or less, or can be 2% or less.

Further, the molded articles obtained by using the polymers of the present invention also exhibit good strength. For example, the value of the Martens hardness determined for films (film thickness: 50 to 500 μm) obtained by using the polymers of the present invention can be 150 N/mm² or more, or can be 180 N/mm² or more. The Martens hardness here refers to the hardness calculated from the indentation load-depth curve (according to ISO14577).

The polymers of the present invention have a lactone ring, which undergoes ring opening in alkaline solutions so that they can be conveniently used as, for example, resist materials.

EXAMPLES

The following examples further illustrate the present invention. The materials, amounts used, proportions, process details, procedures and the like shown in the following examples can be changed as appropriate without departing from the spirit of the present invention. Thus, the scope of the present invention is not limited to the specific examples shown below.

Example 1

[Chemical formula 32]

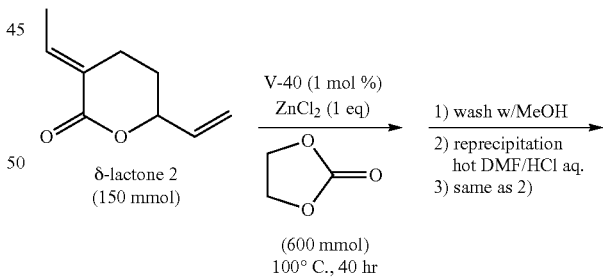

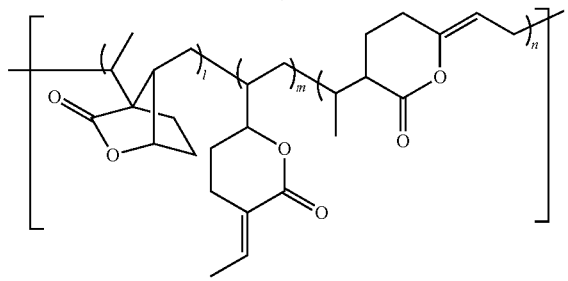

17.1 g; 75% yield

Synthesis Example of Polymer 1

To a solution of 367 mg (1.50 mmol, 1 mol %) of 2,2'-azobis(cyclohexanenitrile) (from Wako Pure Chemical Industries, Ltd.) and 52.8 g (600 mmol, 4.0 equiv.) of ethylene carbonate (from Wako Pure Chemical Industries, Ltd.) dissolved in 22.5 mL (150 mmol) of an unsaturated lactone 2 was added 20.4 g (150 mmol, 1.0 equiv.) of zinc chloride (from Wako Pure Chemical Industries, Ltd.), and the mixture was heated at 100° C. for 40 hours. The reaction mixture was washed with methanol to remove the unreacted monomer, solvent and zinc chloride, and then redissolved in hot DMF (dimethylformamide), and the solution was reprecipitated by dropwise addition to a 1N aqueous hydrochloric acid solution. The reprecipitation was repeated twice, after which a polymerization product (polymer 1) was obtained (17.1 g, 75%, number average molecular weight $2.5 \times 10^4$, PDI (polydispersity index): 7.4, $T_g = 192°$ C., $T_d = 381°$ C.).

In the structure of the polymer 1 shown above, 1, m and n represent the numbers of the respective structural units in their molar ratio, wherein l:m:n=3:4:3.

The $^1$H NMR spectrum of the polymer 1 obtained in Example 1 was determined at 500 MHz in DMSO-$d_6$ at room temperature. The analytical results are shown in FIG. 1.

Figure 2:
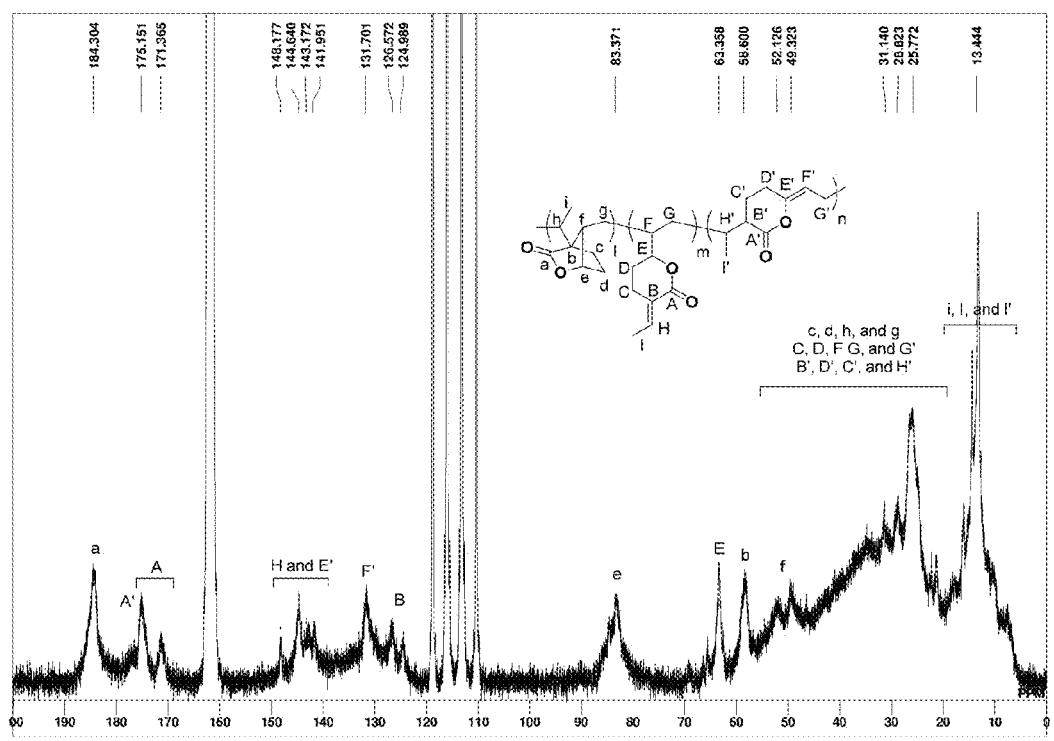
FIG. 2 is a diagram showing the $^{13}$C NMR spectrum of the polymer of Example 1.

The $^{13}$C NMR spectrum of the polymer 1 obtained in Example 1 was also determined at 101 MHz in TFA at room temperature. The analytical results are shown in FIG. 2. In FIG. 2, the peaks A (167 ppm), B (129 ppm), H (135 ppm), and E (62 ppm) represent peaks of the monocyclic structural unit II. Also in FIG. 2, the peaks f (50 ppm), b (58 ppm), e (82 ppm) and a (179 ppm) represent peaks of the bicyclic unit structure I. Further in FIG. 2, the peaks A' (175 ppm), E (138 ppm) and F' (130 ppm) represent peaks of the monocyclic structural unit III.

Figure 3:
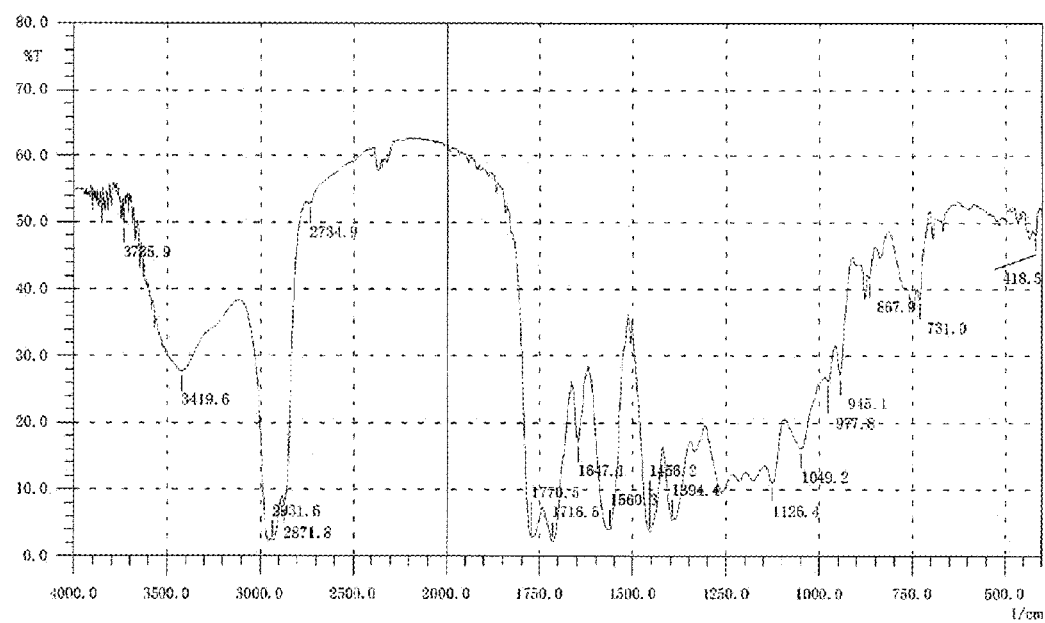
FIG. 3 is a diagram showing the IR spectrum of the polymer of Example 1.

The IR spectrum (KBr disk) of the polymer 1 obtained in Example 1 was also determined. The analytical results are shown in FIG. 3. As shown in FIG. 3, absorption was observed at 1770 cm$^{-1}$ (bicyclic) and 1716 cm$^{-1}$ (monocyclic).

Figure 4:
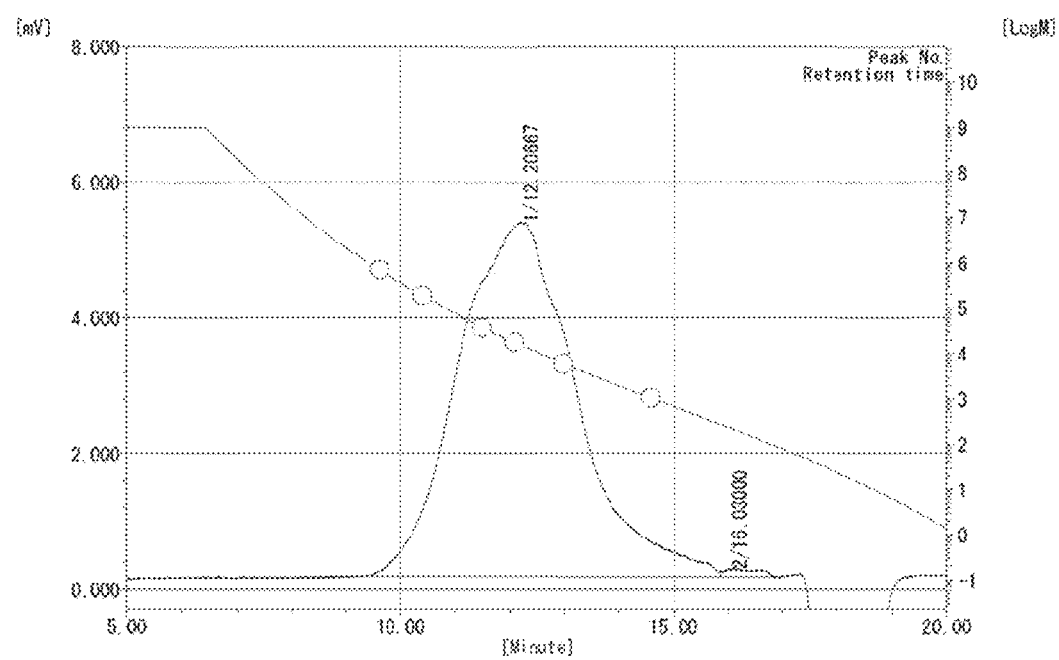
FIG. 4 is a diagram showing the SEC chromatogram of the polymer of Example 1.

The molecular weight of the polymer 1 obtained in Example 1 was also determined by SEC (Size Exclusion Chromatography). The SEC chromatogram is shown in FIG. 4. The determination was made under the condition (A) described above. The number average molecular weight (Mn) was $5.0 \times 10^3$, and the weight average molecular weight (Mw) was $3.6 \times 10^4$.

Example 2

The polymer 2 shown below (the polymer 1 wherein m=n=0) was synthesized by emulsion polymerization of the lactone 2.

[Chemical formula 33]

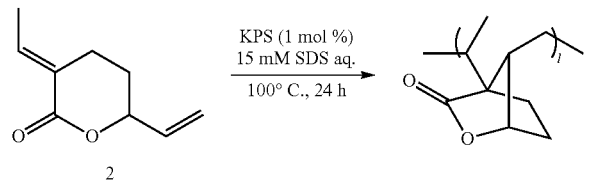

Synthesis Example of Polymer 2

To 0.15 mL (1.0 mmol) of the unsaturated lactone 2 was added 2.7 mg (10 μmol, 1 mol %) of dipotassium peroxodisulfate (from Wako Pure Chemical Industries, Ltd.), and 2.5 mL of a 15 mM aqueous sodium lauryl sulfate solution was added, and the mixture was vigorously stirred at normal temperature to prepare an emulsion. The emulsion was heated at 100° C. for 24 hours, and then the reaction mixture was washed with methanol and water to remove the unreacted monomer, solvent and emulsifier, thereby giving a polymerization product (polymer 2) (32.8 mg, 22%, number average molecular weight: $8.1 \times 10^3$, PDI: 1.2).

Figure 7:
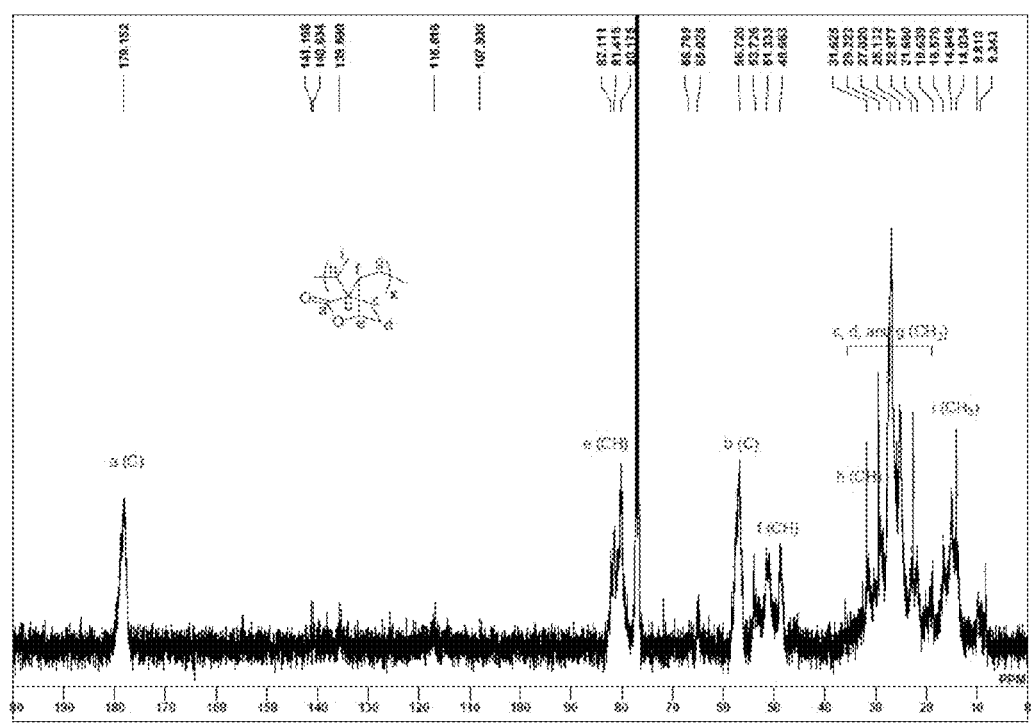
FIG. 7 is a diagram showing the $^{13}$C NMR spectrum of the polymer of Example 2.

The $^{13}$C NMR spectrum of the polymer 2 obtained in Example 2 was determined at 101 MHz in chloroform at room temperature. The analytical results are shown in FIG. 7. In the spectrum shown in FIG. 7, the symbols a to i correspond to the symbols a to i respectively in the structure of the polymer 2 shown in FIG. 7. The results shown in FIG. 7 demonstrated that the polymer 2 shown above was obtained in Example 2.

Example 3

The polymer 2 shown below (the polymer 1 wherein m=n=0) was synthesized by solution polymerization of the lactone 2 in the presence of 2 equivalents of acetic acid.

[Chemical formula 34]

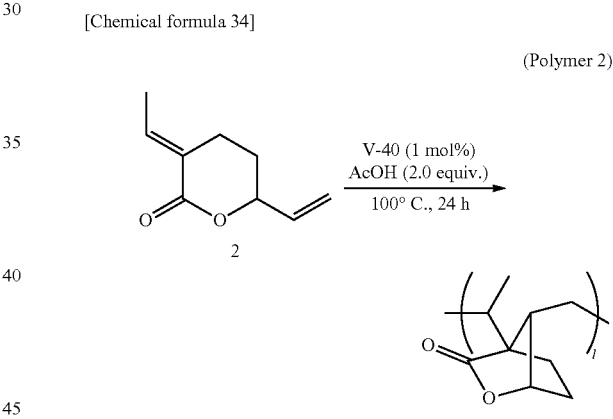

Synthesis Example of Polymer 2

To 0.15 mL (1.0 mmol) of the unsaturated lactone 2 were added acetic acid (2.0 mmol from KANTO CHEMICAL CO., INC.) and 2,2'-azobis(cyclohexanenitrile) (2.4 mg (0.01 mmol) from Wako Pure Chemical Industries, Ltd.), and the mixture was heated at 100° C. for 24 hours. The reaction mixture was washed with methanol and water to remove the unreacted monomer and additives, thereby giving a polymerization product (polymer 2) (25.8 mg, 17%, number average molecular weight: $1.9 \times 10^4$, PDI: 1.1).

The $^{13}$C NMR spectrum of the polymer 2 obtained in Example 3 was determined at 101 MHz in chloroform at room temperature. The analytical results were similar to those shown in FIG. 7, demonstrating that the polymer 2 shown above was obtained in Example 3.

Example 4

The polymer 1 was synthesized in one pot from butadiene and carbon dioxide.

[Chemical formula 35]

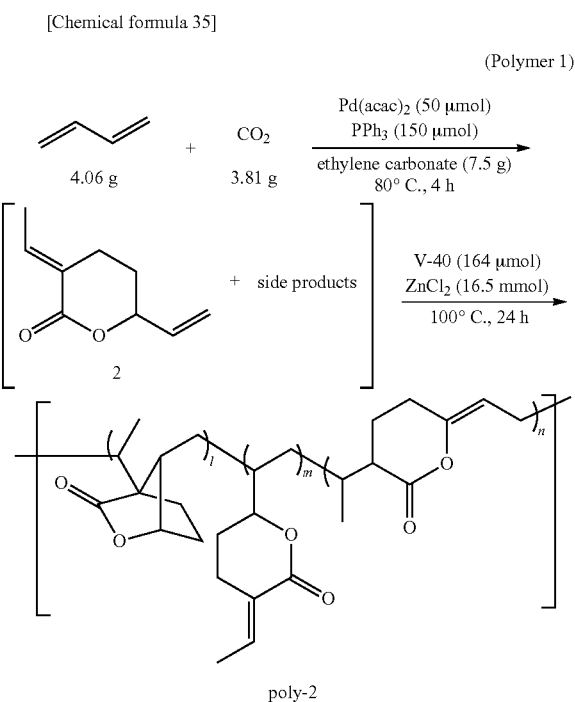

Synthesis Example of Polymer 1

In a 50-mL stainless steel autoclave, Pd(acac)$_2$ (15.3 mg, 0.050 mmol from Wako Pure Chemical Industries, Ltd.), PPh$_3$ (39.3 mg, 0.0150 mmol from KANTO CHEMICAL CO., INC.) and ethylene carbonate (7.50 g (85.2 mmol) from Wako Pure Chemical Industries, Ltd.) were added, and the mixture was cooled to −20° C., and exposed to an atmosphere of butadiene (from TAKACHIHO CHEMICAL INDUSTRIAL CO., LTD.) with stirring for 6 minutes, whereby butadiene (4.06 g, 74.6 mmol) was added. Into the autoclave was added 3.81 g of CO$_2$, and the mixture was heated at 80° C. for 4 hours and cooled and the pressure was released, and then a small amount was sampled to determine the yield of the lactone.

To the resulting mixture were added 2,2'-azobis(cyclohexanenitrile) (40.1 mg (0.164 mmol) from Wako Pure Chemical Industries, Ltd.) and zinc chloride (2.25 g (16.5 mmol) from Wako Pure Chemical Industries, Ltd.), and the mixture was heated at 100° C. for 24 hours. The reaction mixture was ground and washed with methanol and hexane to remove the unreacted monomer, solvent, and zinc chloride. The crude product was dissolved in hot DMF and the solution was reprecipitated by dropwise addition to a 1N aqueous hydrochloric acid solution to give a polymerization product (yield after drying 2.37 g, yield relative to butadiene 42%).

<Evaluation of the Heat Resistance of Polymer 1>

Figure 5:
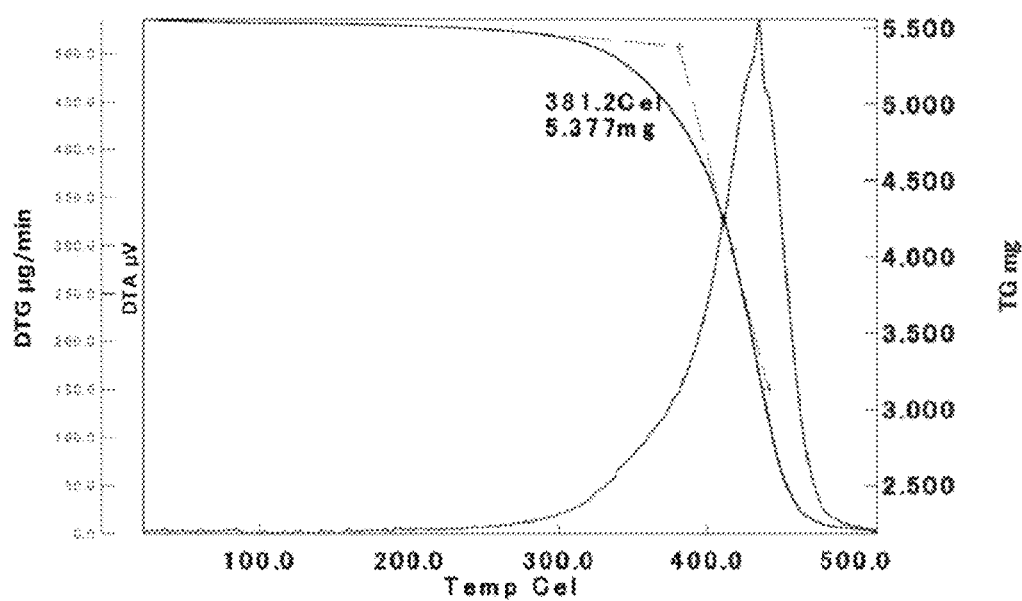
FIG. 5 is a diagram showing the TGA plot of the polymer of Example 1.

The polymer 1 obtained in Example 1 was analyzed by thermogravimetry (TG). The TGA plot is shown in FIG. 5. The analysis was performed by heating at a rate of 10° C./min in the temperature range of 40 to 500° C. under atmospheric conditions. It was shown from the analytical results that the temperature at which the weight loss reached 5% was 340° C., which was reported as the thermal decomposition temperature (Td).

Figure 6:
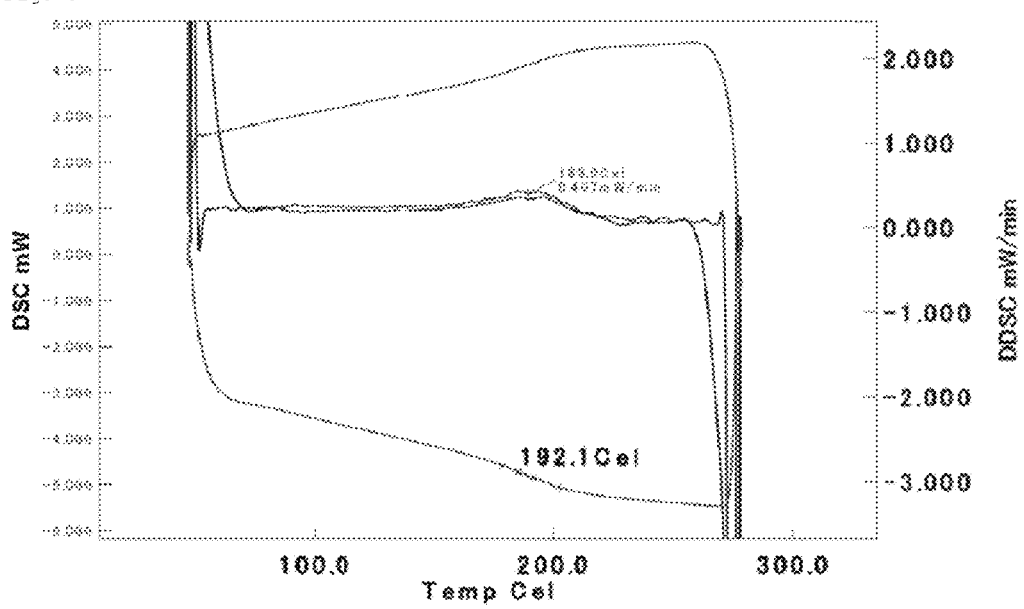
FIG. 6 is a diagram showing the DSC plot of the polymer of Example 1.

The polymer 1 obtained in Example 1 was also analyzed by differential scanning calorimetry (DSC). The DSC plot is shown in FIG. 6. The analysis was performed by heating at a rate of 20° C./min in the temperature range of 50 to 280° C., holding at 280° C. for 10 minutes, and then cooling at a rate of 20° C./min to 50° C. It was shown from FIG. 6 that the glass transition temperature (Tg) observed during the heating step was 192° C.

The results above demonstrated that the polymer 1 shown above was obtained in Example 1. Further, the polymer 1 obtained in Example 1 was shown to have good heat resistance.

Application Example 1 of Polymer 1

Preparation of a Varnish Comprising Polymer 1

The polymer 1 obtained in Example 1 was dissolved in tetrahydrofuran to give a 30% by mass solution. This was filtered through a filter (pore size 5 μm) to give a varnish.

Application Example 2 of Polymer 1

Preparation of a Coating Film Comprising Polymer 1

The varnish obtained in Application example 2 above was applied on a 80 μm thick, A4 size triacetylcellulose (hereinafter referred to as TAC) film using a bar coater (#12 from DAIICHI RIKA K.K.), and dried at room temperature for 5 minutes, then dried by blowing hot air at 70° C. for 30 minutes, then at 100° C. for 1 hour to give a coating film (coating thickness 10 μm).

Application Example 3 of Polymer 1

Preparation of a Film Comprising Polymer 1

The varnish obtained in Application example 2 above was applied on a glass substrate (300 mm×400 mm) using a Baker applicator (from Eager Corporation) to form a coating of 250 mm in width and 400 μm in thickness. The coating was dried at room temperature, and then carefully peeled off from the glass substrate and held taut in a stainless steel frame, and dried by blowing hot air at 70° C. for 30 minutes, and further dried under vacuum at 100° C. for 1 hour to give a transparent film (film thickness 40 μm) formed of the polymer 1.

Application Example 4 of Polymer 1

Preparation of a Molded Article Comprising Polymer 1

The polymer 1 obtained in Example 1 was filled in a US-made small size rectangular mold of 30 mm×50 mm (thickness 200 μm) and compression molded under the molding conditions shown below using an automatic twin vacuum press (from Baldwin-Japan Ltd.) to give a transparent homogeneous molded article comprising the polymer 1.

<<<Molding Conditions>>>
Temperature: 225° C.
Pressure: 20 MPa
Time: 3 minutes.
<Evaluation>
<<(1) Film Transparency>>

The transparency of the film obtained in Application example 3 above was measured using the haze meter NDH5000 (from NIPPON DENSHOKU INDUSTRIES CO., LTD.). The haze value was 1.6%.

<<(2) Strength of the Molded Article>>

The Martens hardness of the film obtained in Application example 4 above was measured using the nanoindentation tester model HM500 (from Fischer Instruments). A Berkovich diamond indenter was pressed into a sample surface over a loading time of 10 sec until a maximum load of 10 mN was reached, and the load was held for 5 seconds and then removed to measure the Martens hardness. The value obtained was 206 N/mm$^2$.

The Martens hardness here refers to the hardness calculated from the indentation load-depth curve (according to ISO14577).

Example 5

The polymer 3 shown below was synthesized in one pot from 1,3-butadiene, isoprene, and carbon dioxide. In the structure shown below, m1, m2, and n1 represent the numbers of the respective structural units in their molar ratio, wherein m1:m2:n1=1:1:1.

Polymer 3

[Chemical formula 36]

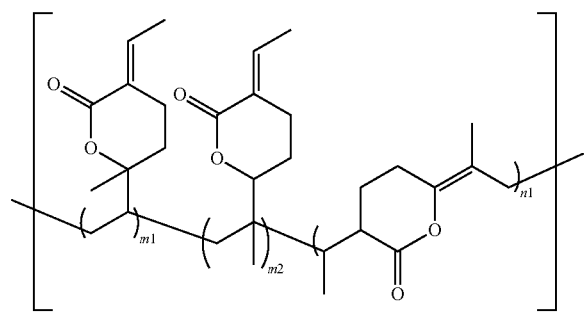

Synthesis Example of Polymer 3

In a 50-mL stainless steel autoclave, palladium (II) acetylacetonate (Pd(acac)$_2$) (30.6 mg, 0.10 mmol from Wako Pure Chemical Industries, Ltd.), triphenylphosphine (PPh$_3$) (78.8 mg, 0.30 mmol from KANTO CHEMICAL CO., INC.), and isoprene (5.0 mL, 50 mmol from Tokyo Chemical Industry Co., Ltd.) were added to ethylene carbonate (7.50 g from Wako Pure Chemical Industries, Ltd.), and the mixture was stirred. The mixture was cooled to −20° C., and stirred with 1,3-butadiene (1.36 g, 25 mmol) for 3 minutes. Into the autoclave was added 3.75 g (86 mmol) of CO$_2$, and the mixture was heated at 80° C. for 20 hours. The gas pressure was released, and the mixture was kept under vacuum for 15 minutes to completely remove the residual diene, and then the mixture was combined with 40.1 mg (0.165 mmol) of 1,1'-azobis(cyclohexane-1-carbonitrile) (V-40 from Wako Pure Chemical Industries, Ltd.) and 2.25 g (16.5 mmol) of zinc chloride (from Wako Pure Chemical Industries, Ltd.), and heated at 100° C. for 24 hours. The resulting mixture was diluted with an excess of methanol (300 mL), and the precipitates were collected and washed with methanol (300 mL) and water (300 mL). The residual solids were dissolved in hot dimethylformamide (DMF) (100 mL), and reprecipitated with an aqueous hydrochloric acid solution (1.0 M, 1.0 L) to give a terpolymer 3 (yield after drying: 2.20 g; Mn: 5.5×10$^3$; Mw/Mn: 2.5; carbon dioxide uptake in the polymer 3: 20% by mass; yield relative to the total of 1,3-butadiene and isoprene: 46% by mass).

Figure 8:
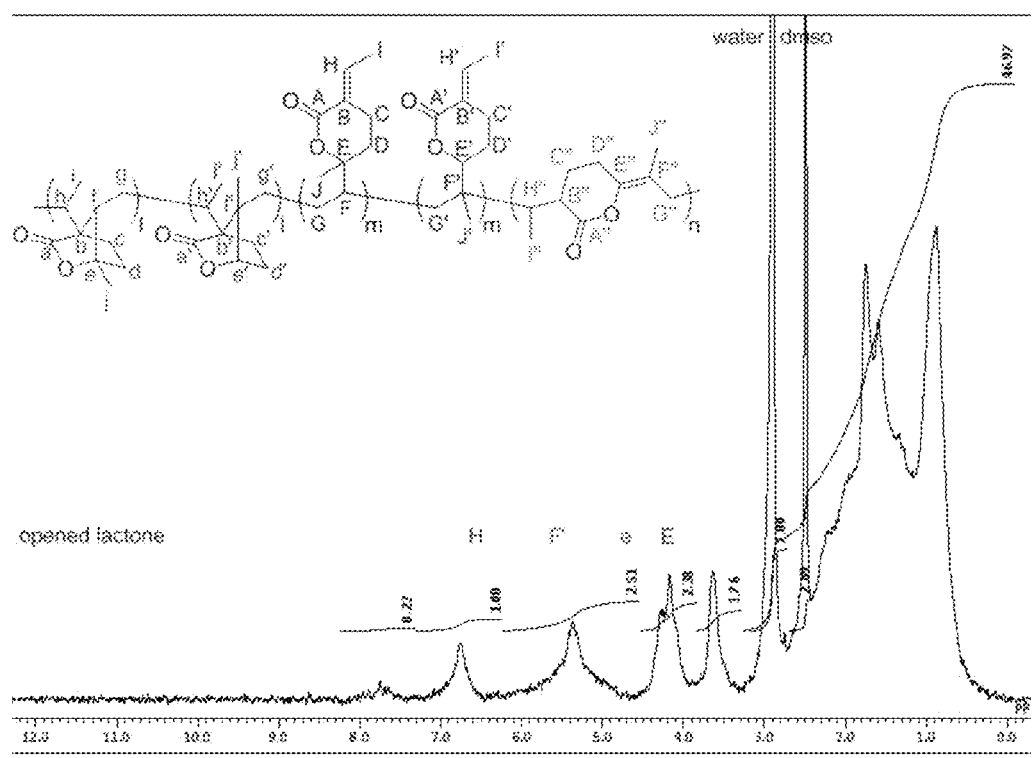
FIG. 8 is a diagram showing the $^1$H NMR spectrum of the polymer of Example 5.

The $^1$H NMR spectrum of the polymer 3 obtained in Example 5 was determined at 400 MHz in DMSO-d$_6$ at room temperature. The analytical results are shown in FIG. 8.

Figure 9:
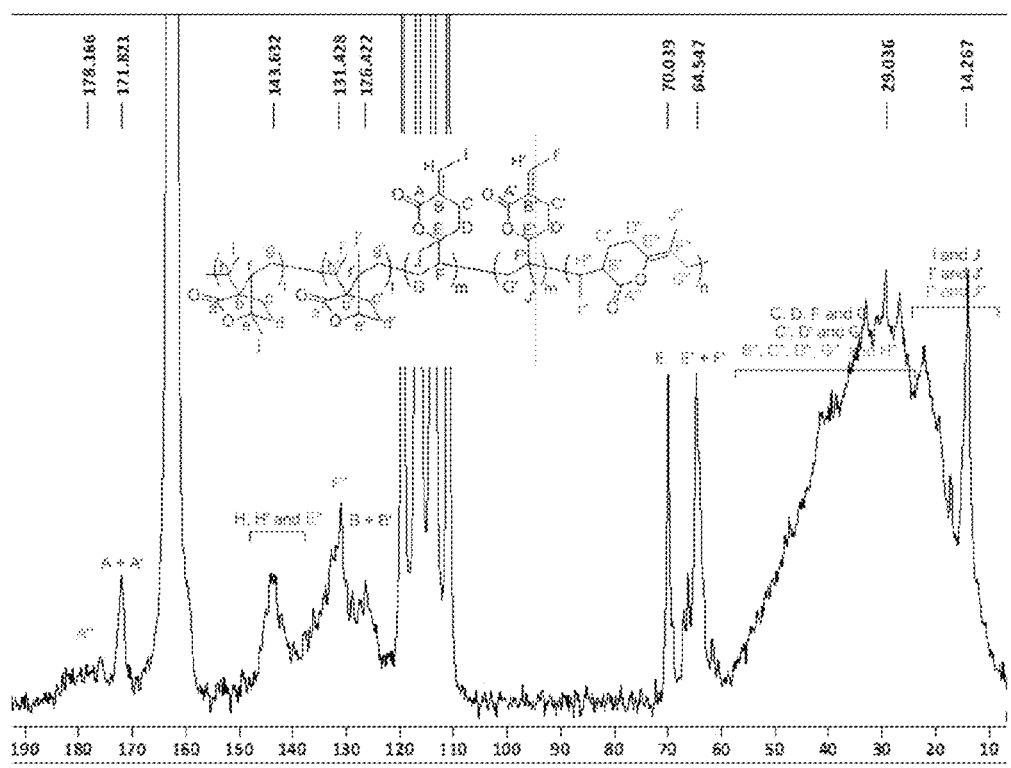
FIG. 9 is a diagram showing the $^{13}$C NMR spectrum of the polymer of Example 5.

The $^{13}$C NMR spectrum of the polymer 3 obtained in Example 5 was also determined at 101 MHz in TFA at room temperature. The analytical results are shown in FIG. 9. In FIG. 9, the peaks a" to j" and a''' to j''' represent peaks of the monocyclic unit structure (II). Also in Figure, the peaks a'''' to j'''' represent peaks of the monocyclic structural unit (III).

Figure 10:
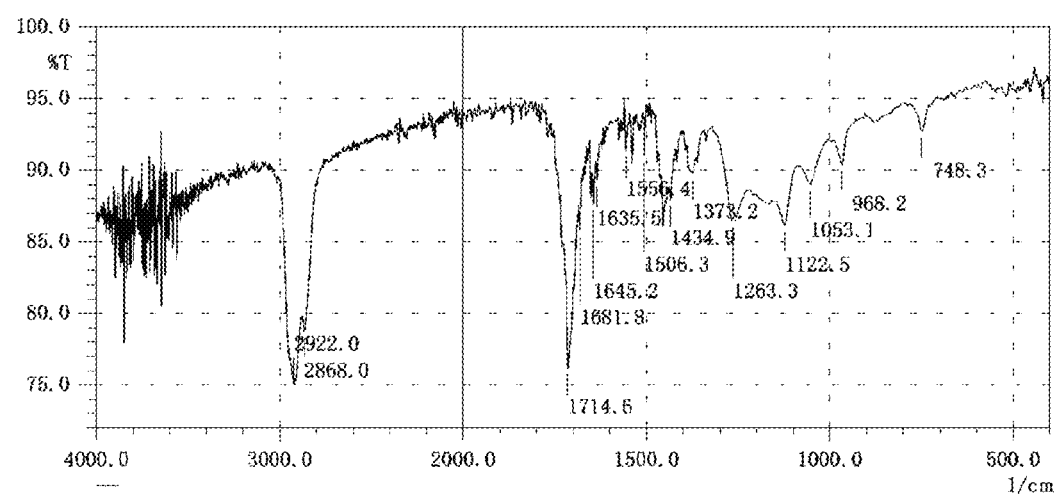
FIG. 10 is a diagram showing the IR spectrum of the polymer of Example 5.

The IR spectrum of the polymer 3 obtained in Example 5 was also determined. The analytical results are shown in FIG. 10. The wavelength and intensity of each peak in FIG. 10 are shown below.

TABLE 1

| Peak No. | Wavelength (cm$^{-1}$) | Intensity (% T) |
|---|---|---|
| 1 | 748.3 | 92.72 |
| 2 | 968.2 | 90.38 |
| 3 | 1053.1 | 88.97 |
| 4 | 1122.5 | 86.14 |
| 5 | 1263.3 | 86.46 |
| 6 | 1373.2 | 89.79 |
| 7 | 1434.9 | 87.95 |
| 8 | 1506.3 | 91.06 |
| 9 | 1556.4 | 91.37 |
| 10 | 1635.5 | 89.33 |
| 11 | 1645.2 | 87.63 |
| 12 | 1681.8 | 85.84 |
| 13 | 1714.6 | 76.16 |
| 14 | 2868 | 78.72 |
| 15 | 2922 | 75.03 |

The molecular weight of the polymer 3 obtained in Example 5 was also determined by SEC. The SEC chromatogram is shown in FIG. 11. The determination was made under the condition (B) described above. The number average molecular weight (Mn) was 1.6×10$^4$ and the weight average molecular weight (Mw) was 3.2×10$^4$, with Mw/Mn being 2.0.

Figure 12:
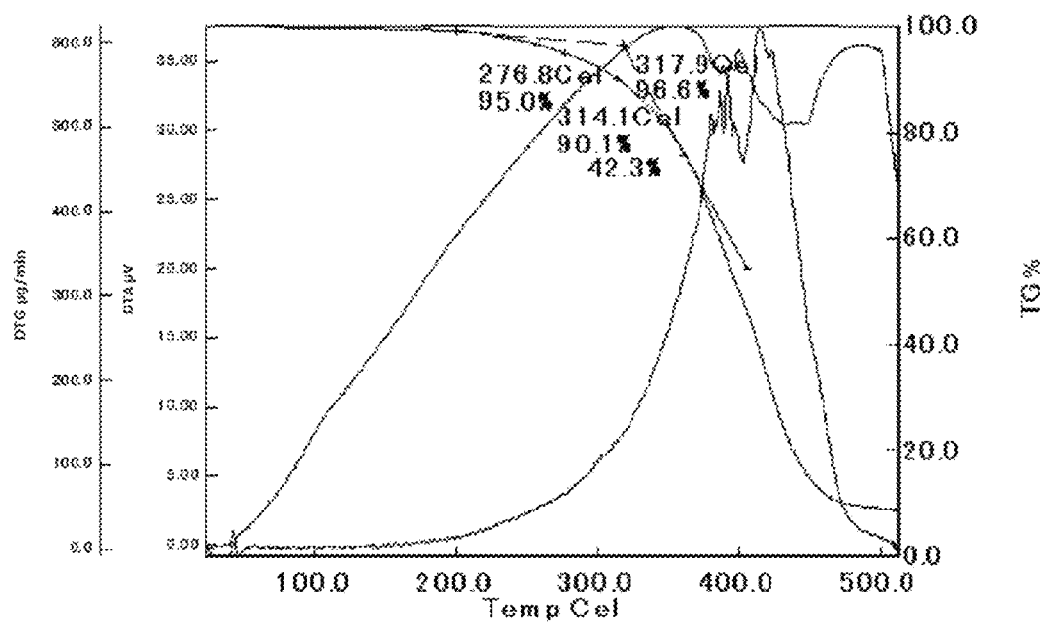
FIG. 12 is a diagram showing the TGA plot of the polymer of Example 5.

The polymer 3 obtained in Example 5 was analyzed by thermogravimetry (TG). The TGA plot is shown in FIG. 12. The analysis was performed by heating at a rate of 10° C./min in the temperature range of 40 to 500° C. under atmospheric conditions. It was shown from the analytical results that the temperature at which the weight loss reached 5% was 240° C., which was reported as the thermal decomposition temperature (Td).

Figure 13:
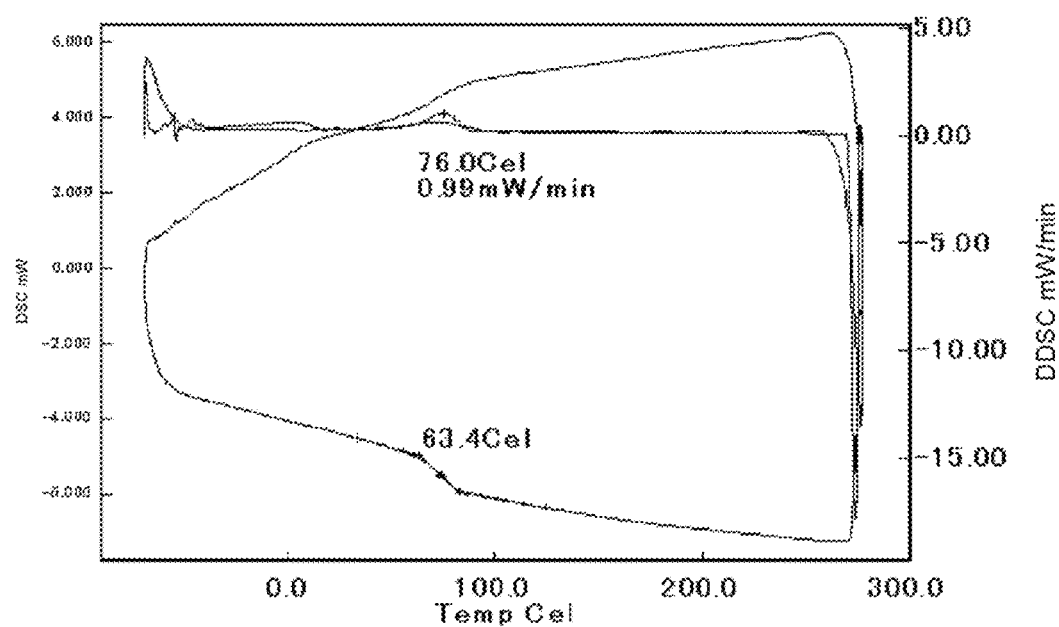
FIG. 13 is a diagram showing the DSC plot of the polymer of Example 5.

The polymer 3 obtained in Example 5 was also analyzed by differential scanning calorimetry (DSC). The DSC plot is shown in FIG. 13. The analysis was performed by heating at a rate of 20° C./min in the temperature range of −70 to 280° C., holding at 280° C. for 10 minutes, and then cooling at a rate of 20° C./min to −70° C. It was shown from FIG. 13 that the glass transition temperature (Tg) observed during the heating step was 33° C.

The results above demonstrated that the polymer 3 was obtained in Example 5. Further, the polymer 3 obtained in Example 5 was shown to have good heat resistance.

Example 6

The polymer 4 shown below was synthesized in one pot from 1,3-butadiene, 1,3-pentadiene and carbon dioxide. In the structure shown below, l3, m3 and n2 represent the numbers of the respective structural units in their molar ratio, wherein l3:m3:n2=1:4:5.
Polymer 4

[Chemical formula 37]

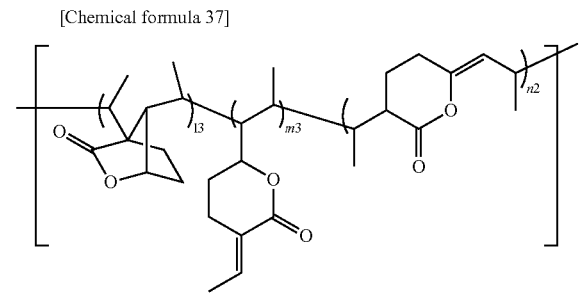

Synthesis Example of Polymer 4

In a 50-mL stainless steel autoclave, palladium (II) acetylacetonate (Pd(acac)$_2$) (30.6 mg, 0.10 mmol from Wako Pure Chemical Industries, Ltd.), triphenylphosphine (PPh$_3$) (78.8 mg, 0.30 mmol from KANTO CHEMICAL CO., INC.) and 1,3-pentadiene (5.0 mL, 50 mmol from Tokyo Chemical Industry Co., Ltd.) were added to ethylene carbonate (7.50 g from Wako Pure Chemical Industries, Ltd.), and the mixture was stirred. The mixture was cooled to −20° C. and stirred with 1,3-butadiene (1.34 g, 25 mmol) for 3 minutes. Into the autoclave was added 3.75 g (86 mmol) of CO$_2$, and the mixture was heated at 80° C. for 20 hours. The gas pressure was released, and the mixture was kept under vacuum for 15 minutes to completely remove the residual dienes, and then the mixture was combined with 40.1 mg (0.165 mmol) of 1,1'-azobis(cyclohexane-1-carbonitrile) (V-40 from Wako Pure Chemical Industries, Ltd.) and 2.25 g (16.5 mmol) of zinc chloride (from Wako Pure Chemical Industries, Ltd.), and heated at 100° C. for 24 hours. The resulting mixture was diluted with an excess of methanol (300 mL), and the precipitates were collected and washed with methanol (300 mL) and water (300 mL). The residual solids were dissolved in hot dimethylformamide (DMF) (100 mL), and reprecipitated with an aqueous hydrochloric acid solution (1.0 M, 1.0 L) to give a terpolymer 3 (yield after drying: 2.74 g; Mn: 1.6×10$^4$; Mw/Mn: 2.0; carbon dioxide uptake in the polymer 3: 24% by mass; yield relative to the total of 1,3-butadiene and 1,3-pentadiene: 35% by mass).

Figure 14:
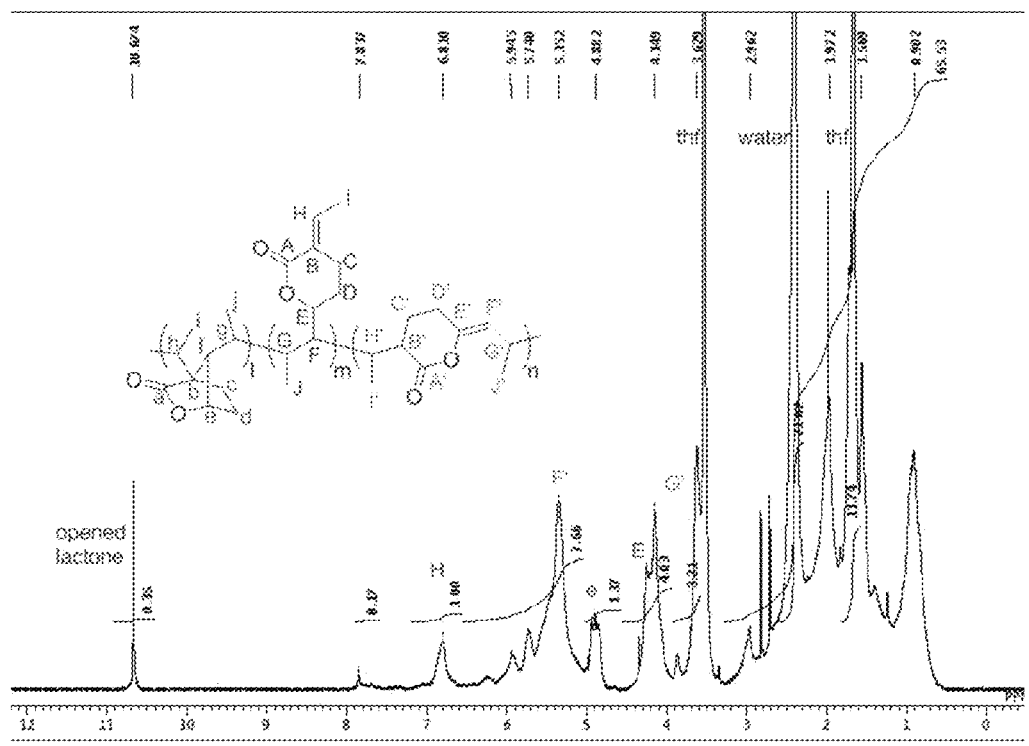
FIG. 14 is a diagram showing the $^1$H NMR spectrum of the polymer of Example 6.

The $^1$H NMR spectrum of the polymer 4 obtained in Example 6 was determined at 400 MHz in DMSO-d$_5$ at room temperature. The analytical results are shown in FIG. 14.

Figure 15:
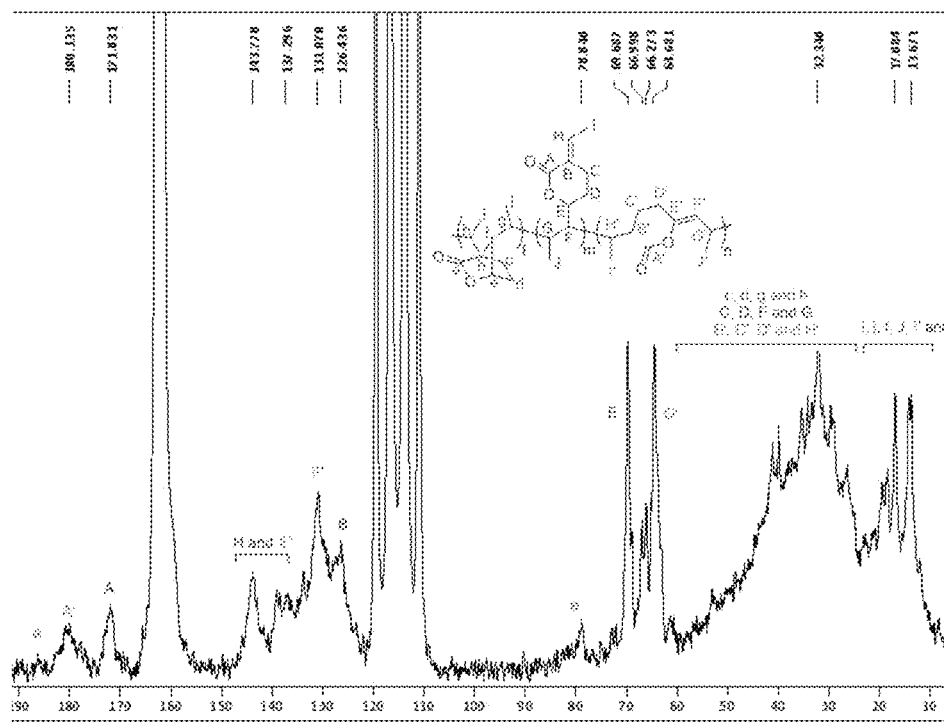
FIG. 15 is a diagram showing the $^{13}$C NMR spectrum of the polymer of Example 6.

The $^{13}$C NMR spectrum of the polymer 4 obtained in Example 6 was also determined at 101 MHz in TFA (trifluoroacetic acid) at room temperature. The analytical results are shown in FIG. 15. In FIG. 15, the peaks a'-j' represent peaks of the monocyclic unit structure (II-a). Also in FIG. 15, the peaks a to j represent peaks of the bicyclic unit structure (I-a). Further in FIG. 15, the peaks a" to j" represent the monocyclic structural unit (III-a).

Figure 16:
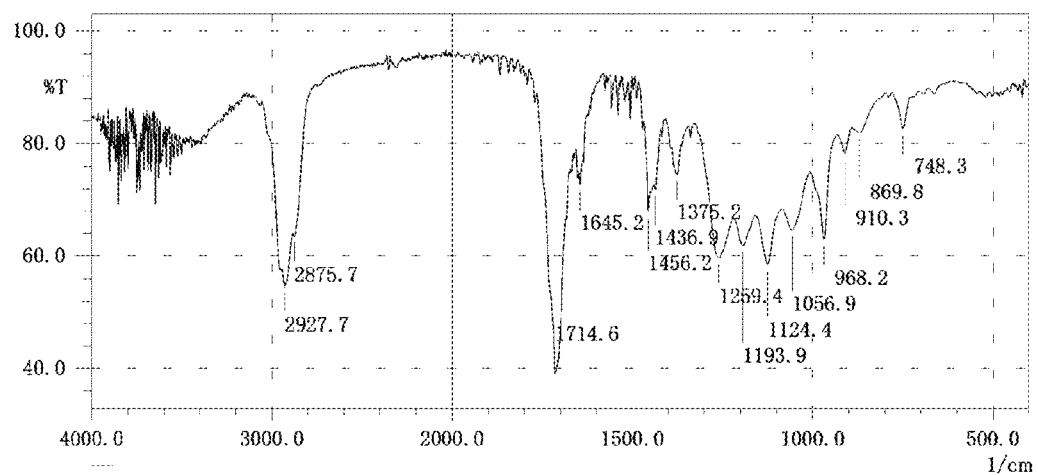
FIG. 16 is a diagram showing the IR spectrum of the polymer of Example 6.
Figure 17:
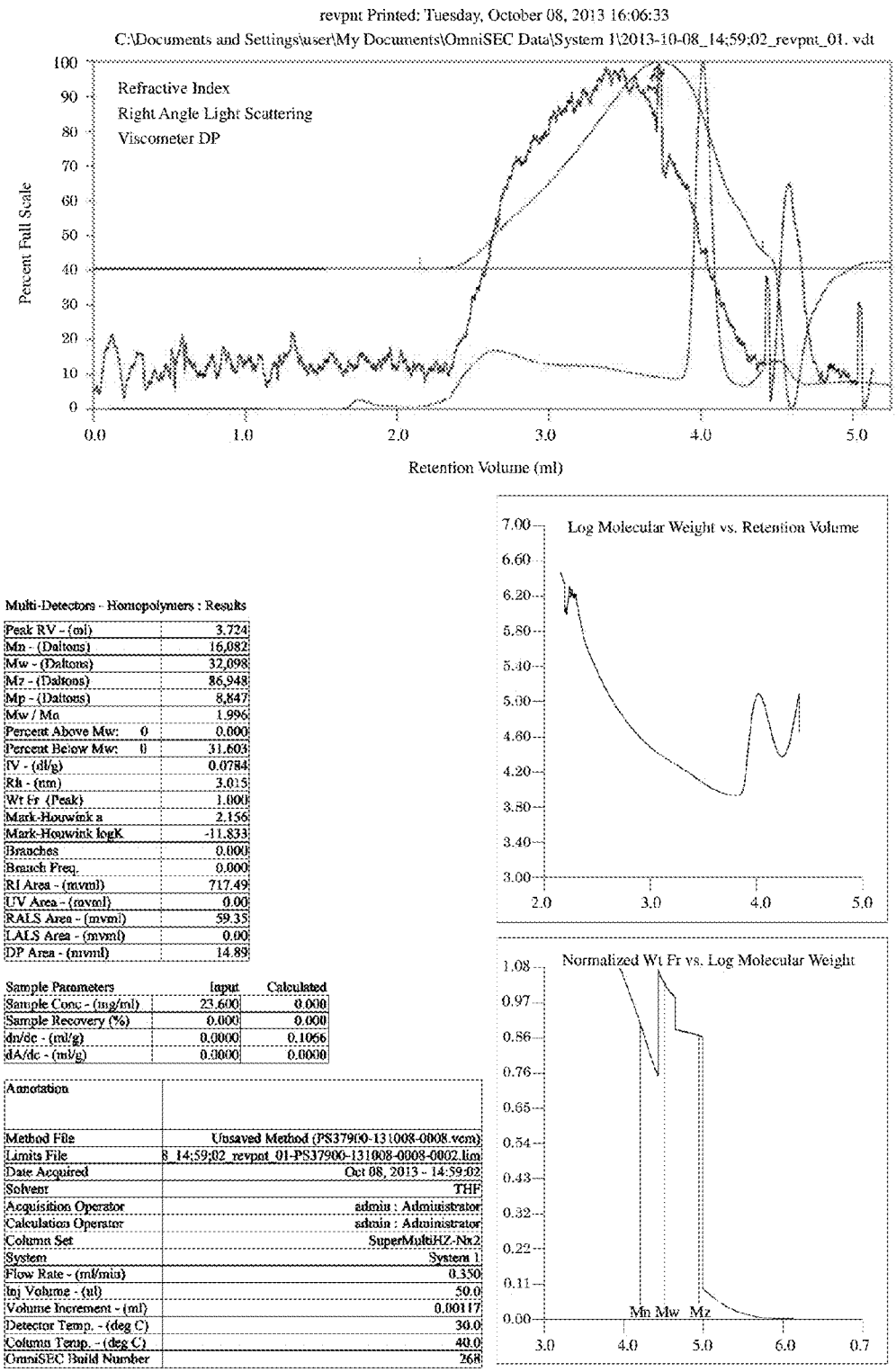
FIG. 17 is a diagram showing the SEC chromatogram of the polymer of Example 6.

The IR spectrum of the polymer 4 obtained in Example 6 was also determined. The analytical results are shown in FIG. 17. The wavelength and intensity of each peak in FIG. 16 are shown below.

TABLE 2

| Peak No. | Wavelength (cm$^{-1}$) | Intensity (% T) |
|---|---|---|
| 1 | 748.3 | 82.71 |
| 2 | 869.8 | 81.94 |
| 3 | 910.3 | 78.37 |
| 4 | 968.2 | 62.9 |
| 5 | 1056.9 | 64.65 |
| 6 | 1124.4 | 58.55 |
| 7 | 1193.9 | 61.88 |
| 8 | 1259.4 | 59.72 |
| 9 | 1375.2 | 74.62 |
| 10 | 1436.9 | 71.79 |
| 11 | 1456.2 | 67.95 |
| 12 | 1645.2 | 72.78 |
| 13 | 1714.6 | 39.17 |
| 14 | 2875.7 | 63.54 |
| 15 | 2927.7 | 54.51 |

The molecular weight of the polymer 4 obtained in Example 6 was also determined by SEC. The SEC chromatogram is shown in FIG. 17. The determination was made under the condition (B) described above. The number average molecular weight (Mn) was 5.5×10$^3$ and the weight average molecular weight (Mw) was 1.4×10$^4$, with Mw/Mn being 2.5.

Figure 18:
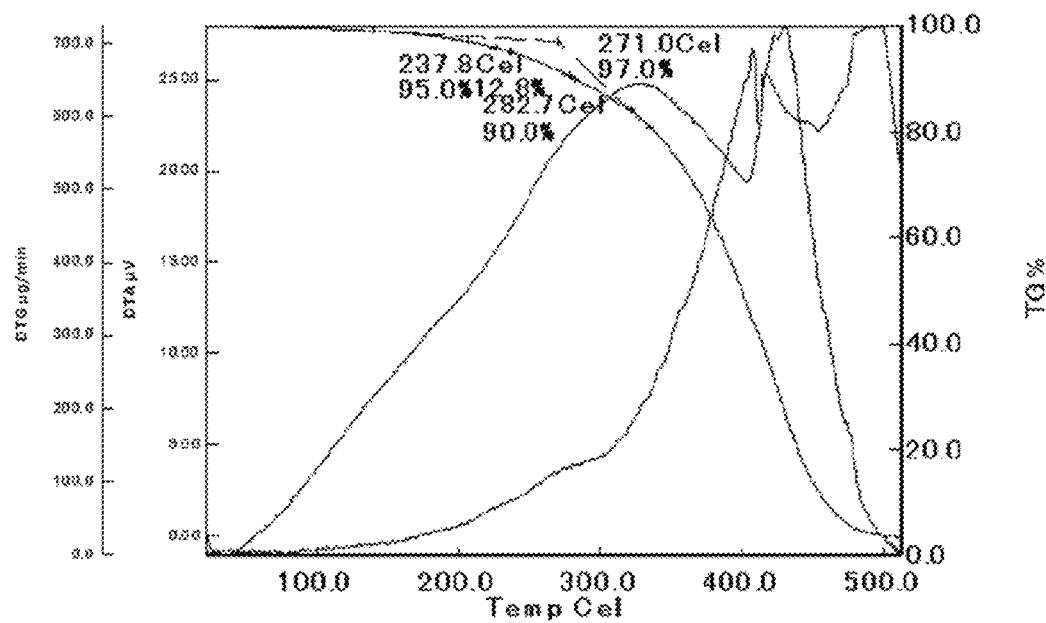
FIG. 18 is a diagram showing the TGA plot of the polymer of Example 6.

The polymer 4 obtained in Example 6 was analyzed by thermogravimetry (TG). The TGA plot is shown in FIG. 18. The analysis was performed by heating at a rate of 10° C./min in the temperature range of 40 to 500° C. under atmospheric conditions. It was shown from the analytical results that the temperature at which the weight loss reached 5% was 277° C., which was reported as the thermal decomposition temperature (Td).

Figure 19:
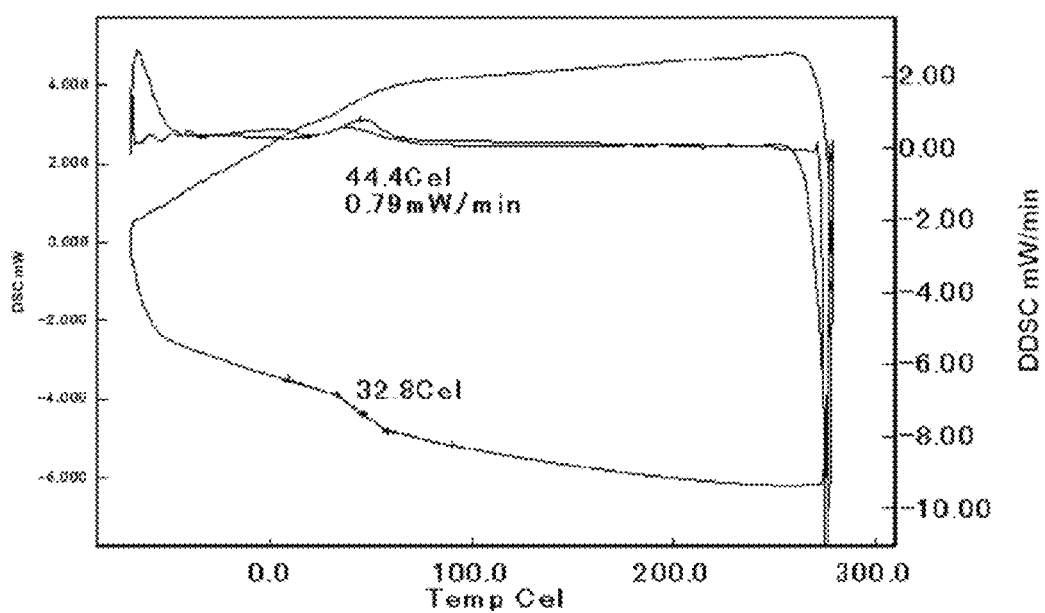
FIG. 19 is a diagram showing the DSC plot of the polymer of Example 6.

The polymer 4 obtained in Example 6 was also analyzed by differential scanning calorimetry (DSC). The DSC plot is shown in FIG. 19. The analysis was performed by heating at a rate of 20° C./min in the temperature range of −70 to 280° C., holding at 280° C. for 10 minutes, and then cooling at a rate of 20° C./min to −70° C. It was shown from FIG. 19 that the glass transition temperature (Tg) observed during the heating step was 63° C.

The results above demonstrated that the polymer 4 was obtained in Example 6. Further, the polymer 4 obtained in Example 6 was shown to have good heat resistance.

INDUSTRIAL APPLICABILITY

The polymers of the present invention have excellent thermal properties. The polymers disclosed in non-patent document 5 cited above are shown to have a Tg (glass transition temperature) of −30° C. or less even though they are made from a similar monomer represented by Formula (IV) (see Tab. 2 in non-patent document 5). In contrast, the polymers of the present invention comprising the structure represented by Formula (I) above exhibited a Tg higher than 190° C. Further, the polymers of the present invention also have a sufficiently high Td (thermal decomposition temperature) so that they can be melt-molded without affecting their properties by heating. The molded articles obtained therefrom exhibited good hardness.

Additionally, the polymers of the present invention exhibit good solubility in various organic solvents so that they can be used as varnishes. Further, the polymers of the present invention also have excellent transparency so that they can be used as, for example, transparent coating materials.

What is claimed is:

1. A polymer comprising a structural unit having a lactone ring containing three or more carbon atoms,
wherein at least one of the carbon atoms, except for C of —C(=O)O—, of the lactone ring forms a part of a main chain; and
wherein at least one of the carbon atoms, except for C of —C(=O)O—, which forms the lactone ring and is other than the carbon atom(s) forming a part of the main chain is bridged with an atom of the main chain.

2. The polymer according to claim 1, comprising a structural unit represented by Formula (I-a):

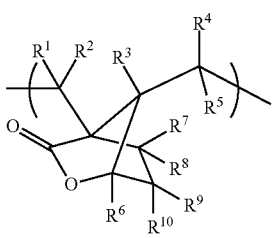

wherein $R^1$ to $R^{10}$ each independently represent a monovalent organic group, a hydrogen atom or a hydrogen atom.

3. The polymer according to claim 1, comprising a structural unit represented by Formula (I):

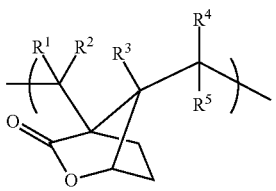

wherein $R^1$ to $R^5$ each independently represent a monovalent organic group, a halogen atom or a hydrogen atom.

4. The polymer according to claim 1, further comprising a structural unit represented by Formula (II-a) and/or a structural unit represented by Formula (III-a):

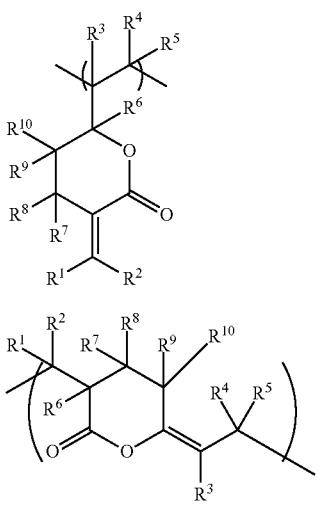

wherein, in Formula (II-a), $R^1$ to $R^{10}$ each independently represent a monovalent organic group, a halogen atom or a hydrogen atom; and in Formula (III-a), $R^1$ to $R^{10}$ each independently represent a monovalent organic group, a halogen atom or a hydrogen atom.

5. The polymer according to claim 1, further comprising a structural unit represented by Formula (II) and/or a structural unit represented by Formula (III);

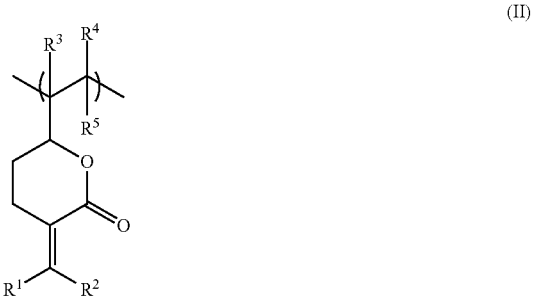

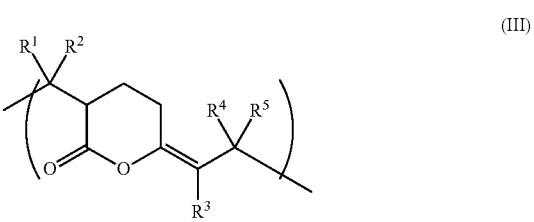

wherein, in Formula (II), $R^1$ to $R^5$ each independently represent a monovalent organic group, a halogen atom or a hydrogen atom; and in Formula (III), $R^1$ to $R^5$ each independently represent a monovalent organic group or a hydrogen atom.

6. The polymer according to claim 1, comprising a structural unit represented by Formula (I-a), a structural unit represented by Formula (II-a) and a structural unit represented by Formula (III-a):

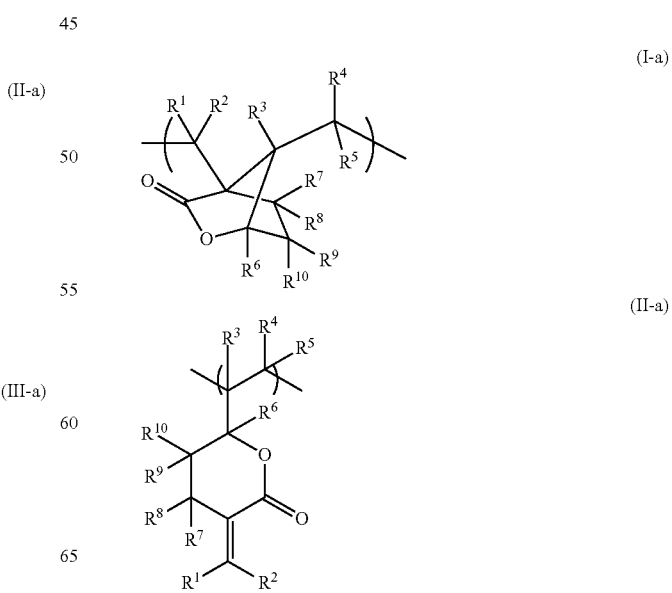

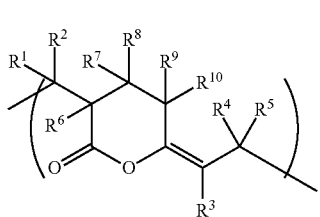
(III-a)

wherein, in Formula (I-a), $R^1$ to $R^{10}$ each independently represent a monovalent organic group, a halogen atom or a hydrogen atom; in Formula (II-a), $R^1$ to $R^{10}$ each independently represent a monovalent organic group, a halogen atom or a hydrogen atom; and in Formula (III-a), $R^1$ to $R^{10}$ each independently represent a monovalent organic group, a halogen atom or a hydrogen atom.

7. The polymer according to claim 1, comprising a structural unit represented by Formula (I), a structural unit represented by Formula (II) and a structural unit represented by Formula (III):

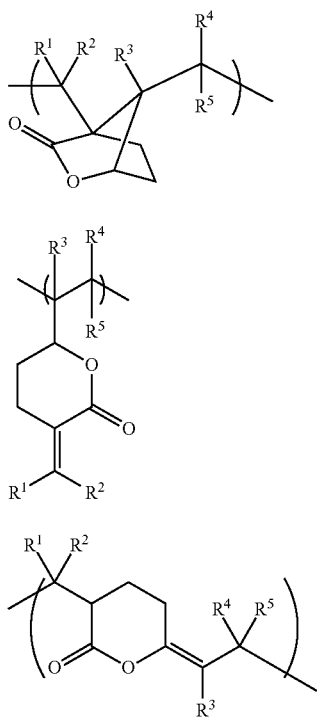

wherein, in Formula (I), $R^1$ to $R^5$ each independently represent a monovalent organic group, a halogen atom or a hydrogen atom; in Formula (II), $R^1$ to $R^5$ each independently represent a monovalent organic group, a halogen atom or a hydrogen atom; and in Formula (III), $R^1$ to $R^5$ each independently represent a monovalent organic group, a halogen atom or a hydrogen atom.

8. A polymer comprising at least one of a structural unit represented by Formula (I-a), a structural unit represented by Formula (II-a) and a structural unit represented by Formula (III-a):

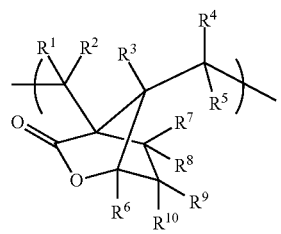
(I-a)

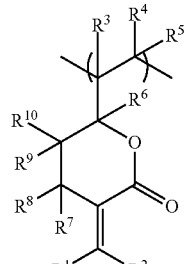
(II-a)

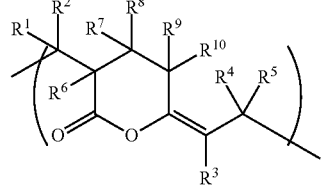
(III-a)

wherein, in Formula (I-a), $R^1$ to $R^{10}$ each independently represent a monovalent organic group, a halogen atom or a hydrogen atom; in Formula (II-a), $R^1$ to $R^{10}$ each independently represent a monovalent organic group, a halogen atom or a hydrogen atom; and in Formula (III-a), $R^1$ to $R^{10}$ each independently represent a monovalent organic group, a halogen atom or a hydrogen atom.

9. The polymer according to claim 1, obtained by radically homopolymerizing a compound represented by Formula (IV-a):

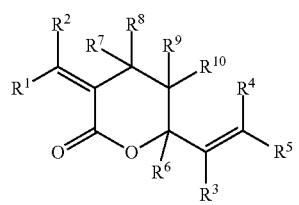
(IV-a)

wherein, in Formula (IV-a), $R^1$ to $R^{10}$ each independently represent a monovalent organic group, a halogen atom or a hydrogen atom.

10. The polymer according to claim 1, obtained by radically homopolymerizing a compound represented by Formula (IV):

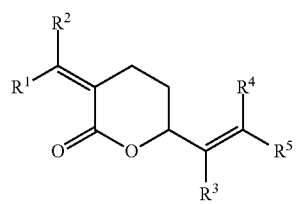
(IV)

wherein $R^1$ to $R^5$ each independently represent a monovalent organic group, a halogen atom or a hydrogen atom.

11. The polymer according to claim 1, which has a thermal decomposition temperature (Td) of 220° C. or more as determined by thermogravimetry (TG) when it is heated at 10° C./min.

12. A varnish comprising the polymer according to claim 1.

13. A molded article comprising the polymer according to claim 1.

14. A process for preparing a polymer, comprising polymerizing a starting monomer including a compound represented by Formula (IV-a) in such a manner that at least one of the rates of thermal isomerization and degradative chain transfer are lower than the rate of the homopolymerization reaction of the monomer:

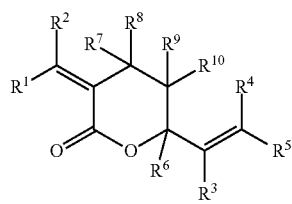

(IV-a)

wherein $R^1$ to $R^{10}$ each independently represent a monovalent organic group, a halogen atom or a hydrogen atom;
wherein the polymer is a polymer comprising a structural unit having a lactone ring containing three or more carbon atoms,
at least one of the carbon atoms, except for C of —C(=O) O—, of the lactone ring forms a part of a main chain; and
at least one of the carbon atoms, except for C of —C(=O) O—, which forms the lactone ring and is other than the carbon atom(s) forming a part of the main chain is bridged with an atom of the main chain.

15. The process for preparing a polymer according to claim 14, comprising polymerizing a starting monomer including a compound represented by Formula (IV) in such a manner that at least one of the rates of thermal isomerization and degradative chain transfer are lower than the rate of the homopolymerization reaction of the monomer:

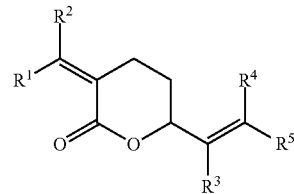

(IV)

wherein $R^1$ to $R^5$ each independently represent a monovalent organic group, a halogen atom or a hydrogen atom;
wherein the polymer is a polymer comprising a structural unit having a lactone ring containing three or more carbon atoms,
at least one of the carbon atoms, except for C of —C(=O) O—, of the lactone ring forms a part of a main chain; and
at least one of the carbon atoms, except for C of —C(=O) O—, which forms the lactone ring and is other than the carbon atom(s) forming a part of the main chain is bridged with an atom of the main chain.

16. The process for preparing a polymer according to claim 14, comprising radically polymerizing the starting monomer in the presence of at least one Bronsted acid or Lewis acid or polymerizing it by emulsion polymerization.

17. A process for preparing a polymer, comprising synthesizing it in one pot from a 1,3-diene compound and carbon dioxide,
wherein the polymer is a polymer comprising a structural unit having a lactone ring containing three or more carbon atoms,
at least one of the carbon atoms, except for C of —C(=O) O—, of the lactone ring forms a part of a main chain; and
at least one of the carbon atoms, except for C of —C(=O) O—, which forms the lactone ring and is other than the carbon atom(s) forming a part of the main chain is bridged with an atom of the main chain.

* * * * *